(12) United States Patent
Kaneda et al.

(10) Patent No.: US 8,254,691 B2
(45) Date of Patent: Aug. 28, 2012

(54) FACIAL EXPRESSION RECOGNITION APPARATUS AND METHOD, AND IMAGE CAPTURING APPARATUS

(75) Inventors: Yuji Kaneda, Kawasaki (JP); Masakazu Matsugu, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 253 days.

(21) Appl. No.: 12/663,855

(22) PCT Filed: Jun. 17, 2008

(86) PCT No.: PCT/JP2008/061376
§ 371 (c)(1),
(2), (4) Date: Dec. 10, 2009

(87) PCT Pub. No.: WO2008/156184
PCT Pub. Date: Dec. 24, 2008

(65) Prior Publication Data
US 2010/0189358 A1    Jul. 29, 2010

(30) Foreign Application Priority Data
Jun. 18, 2007   (JP) .................................. 2007-160680

(51) Int. Cl.
*G06K 9/46*  (2006.01)
(52) U.S. Cl. ......... 382/195; 382/190; 382/103; 382/118
(58) Field of Classification Search .................. 382/190, 382/195, 103; 348/E5.042
See application file for complete search history.

(56) References Cited

U.S. PATENT DOCUMENTS

| | | | |
|---|---|---|---|
| 6,466,685 B1 | 10/2002 | Fukui et al. | |
| 6,816,611 B1 | 11/2004 | Hagiwara et al. | |
| 7,532,745 B2 | 5/2009 | Inoue | |
| 2003/0133599 A1* | 7/2003 | Tian et al. | 382/118 |
| 2009/0190834 A1 | 7/2009 | Inoue | |

FOREIGN PATENT DOCUMENTS

| | | |
|---|---|---|
| JP | 2573126 | 1/1997 |
| JP | 10-232934 | 9/1998 |

(Continued)

OTHER PUBLICATIONS

Kotsia et al: "Facial Expression Recognition in Image Sequences Using Geometric Deformation Features and Support Vector Machines", IEEE Transactions on Image Processing, vol. 16, No. 1, Jan. 2007.*

(Continued)

*Primary Examiner* — Matthew Bella
*Assistant Examiner* — Ruiping Li
(74) *Attorney, Agent, or Firm* — Fitzpatrick, Cella, Harper & Scinto

(57) ABSTRACT

A facial expression recognition apparatus includes an image input unit configured to sequentially input images, a face detection unit configured to detect faces in images obtained by the image input unit, and a start determination unit configured to determine whether to start facial expression determination based on facial image information detected by the face detection unit. When the start determination unit determines that facial expression determination should be started, an acquisition unit acquires reference feature information based on the facial image information detected by the face detection unit and a facial expression determination unit extracts feature information from the facial image information detected by the face detection unit and determines facial expressions of the detected faces based on the extracted feature information and the reference feature information.

16 Claims, 28 Drawing Sheets

FOREIGN PATENT DOCUMENTS

| | | |
|---|---|---|
| JP | 10-255043 | 9/1998 |
| JP | 2840816 | 12/1998 |
| JP | 2000-30065 | 1/2000 |
| JP | 2000-48184 | 2/2000 |
| JP | 2003-281567 A | 10/2003 |
| JP | 2003-323622 | 11/2003 |
| JP | 2005-056387 A | 3/2005 |
| JP | 2005-056388 | 3/2005 |
| JP | 2005-266984 | 9/2005 |
| JP | 2005-293539 | 10/2005 |
| JP | 2006-115406 | 4/2006 |
| JP | 2007-067559 | 3/2007 |
| JP | 2007-087346 | 4/2007 |

OTHER PUBLICATIONS

Paul Viola, et al., "Rapid Object Detection using a Boosted Cascade of Simple Features". Accepted Conference on Computer Vision and Pattern Recognition, pp. 1-9. (2001).

I. Kotsia and I. Pitas, "Real time facial expression recognition from image sequences using Support Vector Machines". Aristotle University of Thessaloniki, Department of Informatics, Sep. 11, 2005.

Japanese Office Action dated Jan. 10, 2012, issued by the Japanese Patent Office, in Japanese Patent Application No. 2007-160680.

* cited by examiner

FACIAL EXPRESSION RECOGNITION APPARATUS AND METHOD, AND IMAGE CAPTURING APPARATUS

TECHNICAL FIELD

The present invention relates to a facial expression recognition apparatus and method, as well as to an image capturing apparatus, in which facial expressions are recognized based on image information depicting people.

BACKGROUND ART

A variety of conventional technologies exist for recognizing facial expressions. In the facial expression recognition described in the specification of Japanese Patent No. 02840816 (hereinafter referred to as Patent Document 1), neutral reference images are prepared in advance for use in the facial expression recognition. The input images and the neutral reference images prepared in advance are then wavelet-transformed to compute the mean power of frequency signals for each band. Facial expressions are then determined by computing the difference between the respective mean powers.

In addition, in the facial expression recognition described in Japanese Patent Laid-Open No. 2005-56388 (hereinafter referred to as Patent Document 2), after extracting prescribed feature points in advance from neutral reference images used in the facial expression recognition, distances between the feature points, etc., are computed. Facial expressions are then determined by similarly computing the distances between the feature points in the input images and calculating the values of the difference between the respective distances.

Furthermore, Japanese Patent Laid-Open No. 2005-266984 (hereinafter referred to as Patent Document 3) describes a facial expression recognition technology that does not use neutral reference images. In the facial expression recognition described in Patent Document 3, after detecting the corners of the mouth and the corners of the right and left eyes in an image, facial expressions are determined based on the ratio of the long side to the narrow side in a rectangle produced by these four points.

Furthermore, in Japanese Patent No. 2573126 (Patent Document 4), a method is described wherein eyebrow motion and other facial expression elements and facial expression element information are obtained from feature locations and facial expression element codes are computed based on the facial expression element information, whereupon the facial expression element codes are employed in a prescribed conversion formula to compute an emotional value.

However, since the facial expression recognitions described in the above-mentioned Patent Document 1 and Patent Document 2 capture changes relative to a neutral state, they have the following significant advantages in comparison with the facial expression recognition technology described in Patent Document 3, which does not use neutral reference images: (1) they can accommodate individual differences in the location of facial organs such as the eyes, the mouth, etc.; (2) they can capture slight variation in facial expression with a relatively high degree of detection accuracy. On the other hand, however, these processes have the following problems: (1) time and labor is required in order to register the neutral images in advance; (2) facial expressions can be recognized only for registered persons; (3) more memory areas are required because the number of images etc. subject to registration depends on the number of persons subject to facial expression recognition; (4) when the imaging environment during registration and imaging environment during facial expression recognition are different, facial expressions are sometimes impossible to recognize with accuracy due to the difference between the imaging environments; (5) the accuracy of facial expression recognition is greatly affected by the variation in the definition of the term "neutral image" among the users registering the neutral images. The above-described five problems result from the fact that users manually register neutral images in advance.

Moreover, in Patent Documents 3 and 4, individual differences in terms of feature point location on faces, etc. cannot be accommodated and it is difficult to improve accuracy because the facial expressions of individual people are determined using a common standard.

DISCLOSURE OF INVENTION

The present invention was made with account taken of the above-described problems and provides a facial expression recognition apparatus and method wherein, in a typical embodiment, the advance registration of images of specific facial expressions is rendered unnecessary and determination of facial expressions is made possible based on the use of the facial features of individual people.

According to one aspect of the present invention, there is provided a facial expression recognition apparatus, comprising:

image input means for sequentially inputting images;

face detection means for detecting faces in images obtained by the image input means;

start determination means for determining whether to start facial expression determination based on the facial image information detected by the face detection means;

acquisition means for acquiring reference feature information based on the facial image information detected by the face detection means when the start determination means determines that facial expression determination should be started; and facial expression determination means for extracting feature information from the facial image information detected by the face detection means when the start determination means determined to start the facial expression determination and determining facial expressions of the detected faces based on the extracted feature information and the reference feature information.

According to another aspect of the present invention, there is provided an image capturing apparatus comprising:

the above described facial expression recognition apparatus;

supplying means for acquiring images in chronological order using image capturing means and supplying the acquired images to the image input means; and recording means for recording the images as captured images when the facial expression determination means determines that the facial expression is the prescribed facial expression.

According to one aspect of the present invention, there is provided a facial expression recognition apparatus comprising:

image input means for sequentially inputting images;

face detection means for detecting faces in the images obtained by the image input means;

feature extraction means for extracting features from faces detected by the face detection means;

storage means for storing the features in a memory when the reliability of the features extracted by the feature extraction means is not less than a threshold value; and facial expression determination means for determining the facial expressions of the faces based on the variation of the features stored in the memory by the storage means.

According to another aspect of the present invention, there is provided a facial expression recognition apparatus comprising:

detection means for detecting a face from sequentially input images;

state determination means for determining a sate of a feature of the face detected by the detection means;

acquisition means for acquiring reference feature information based on image information of the face when the state determination means determined that the feature of the face is in a predetermined state; and facial expression determination means for determining a facial expression of a face newly detected by the detection means, based on the newly detected face and the reference feature information.

According to another aspect of the present invention, there is provided a facial expression recognition method, comprising the steps of:

image input, which involves sequentially inputting images;

face detection, which involves detecting faces in images obtained in the image input step;

start determination, which involves determining whether to start facial expression determination based on the facial image information detected in the face detection step;

acquisition, which involves acquiring reference feature information based on the facial image information detected in the face detection step when the start determination step determines that facial expression determination should be started; and facial expression determination, which involves extracting feature information from the facial image information detected in the face detection step when it was determined to start the facial expression determination in the start determination step and determining facial expressions of the detected faces based on the extracted feature information and the reference feature information.

According to one aspect of the present invention, there is provided a facial expression recognition method based on an information processor comprising the steps of:

image input, which involves sequentially inputting images;

face detection, which involves detecting faces in the images obtained in the image input step;

feature extraction, which involves extracting features from faces detected in the face detection step;

storage, which involves storing the features in a memory when the reliability of the features extracted in the feature extraction step is not less than a threshold value; and facial expression determination, which involves determining the facial expressions of the faces based on the variation of the features stored in the memory in the storage step.

According to one aspect of the present invention, there is provided a facial expression recognition method comprising the steps of:

detecting a face from sequentially input images;

determining a sate of a feature of the face detected in the detection step;

acquiring reference feature information based on image information of the face when the state determination means determined that the feature of the face is in a predetermined state; and facial expression determination, which involves determining a facial expression of a face newly detected in the detecting step, based on the newly detected face and the reference feature information.

Further features of the present invention will become apparent from the following description of exemplary embodiments with reference to the attached drawings.

BEST MODE FOR CARRYING OUT THE INVENTION

Exemplary embodiments of the present invention will now be described in detail in accordance with the accompanying drawings.

Embodiment 1

Figure 1:
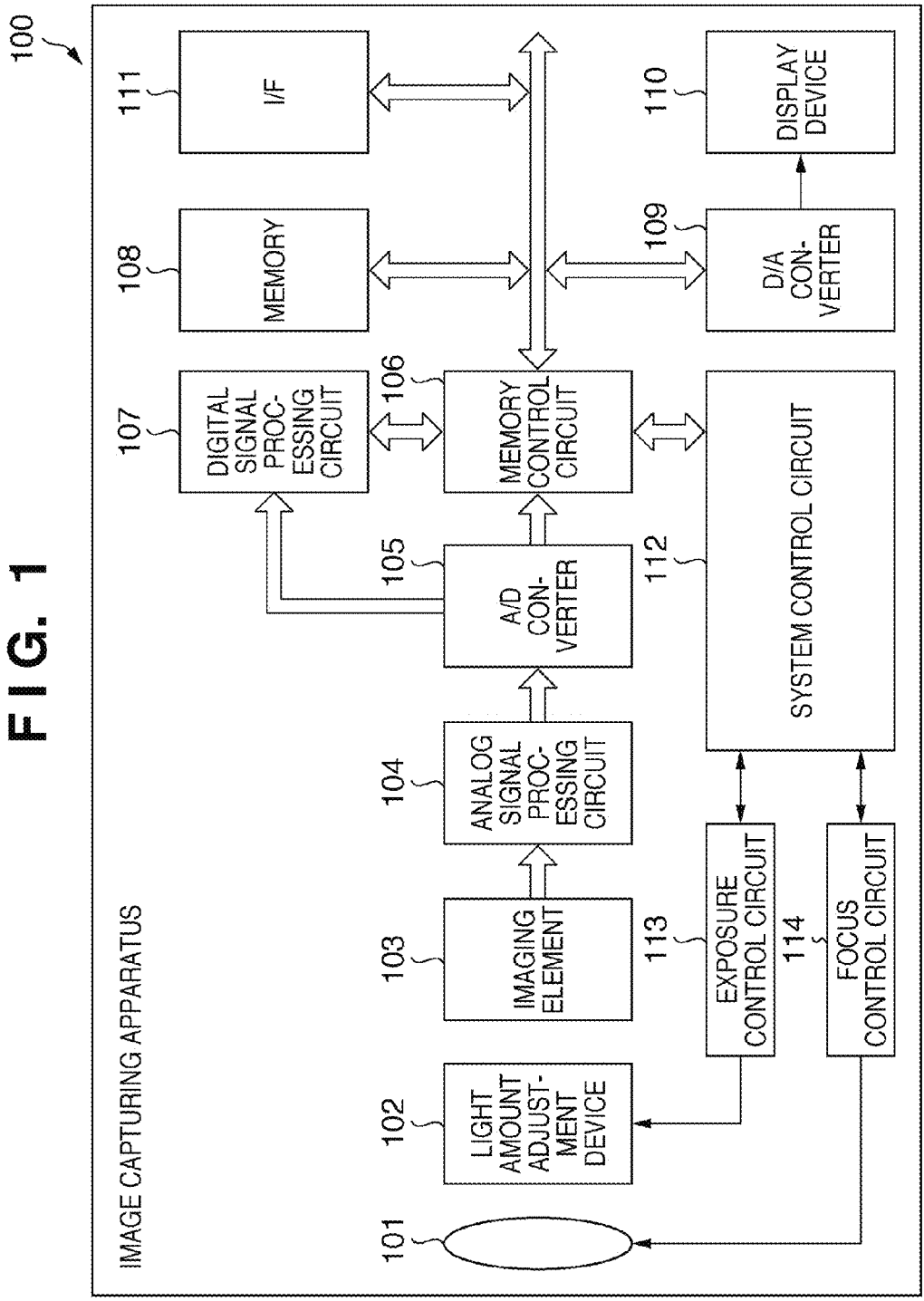
FIG. 1 shows the hardware configuration of the image capturing apparatus according to the present embodiment.

FIG. 1 is a block diagram illustrating the configuration of an image capturing apparatus 100 according to the embodiment. In the present embodiment, an electronic still camera is used as an example of the image capturing apparatus 100. Below, the image capturing apparatus 100 is also referred to as an "electronic camera".

In FIG. 1, the numeral 101 designates an imaging lens group. The numeral 102 designates a light amount adjustment device comprising a diaphragm device and a shutter device. The numeral 103 is an imaging element that converts a luminous flux passing through the imaging lens group 101 and representing a subject image to electrical signals. The imaging element 103 is constituted, for instance, by a CCD or a CMOS, etc. The numeral 104 is an analog signal processing circuit subjecting the analog signal output of the imaging element 103 to clamping and gain processing. The numeral 105 represents an analog-to-digital (A/D below) converter converting the output of the analog signal processing circuit 104 to digital signals.

The numeral 107 represents a digital signal processing circuit carrying out a prescribed pixel interpolation process or color conversion process, etc. on data obtained from the A/D converter 105 or data obtained from a memory control circuit 106. Moreover, the digital signal processing circuit 107 performs prescribed operations on captured image data.

The numeral 112 is a system control circuit exercising control over an exposure control circuit 113 and a focus control circuit 114 based on the results of the operations performed by the digital signal processing circuit 107. As a result, a TTL (through-the-lens) type AF (auto-focusing) process, an AE (automatic exposure) process, and an EF (strobe pre-emission) process are executed. Moreover, the digital signal processing circuit 107 performs prescribed arithmetic operations on captured image data and executes a TTL-type AWB (automatic white balance) process based on the obtained arithmetic operation results. Furthermore, it detects specific subjects in the captured image data and executes facial expression recognition for the specific subjects.

The memory control circuit 106 controls the analog signal processing circuit 104, the A/D converter 105, the digital signal processing circuit 107, a memory 108, and a digital-to-analog (D/A below) converter 109. Data obtained by A/D conversion in the A/D converter 105 is written to the memory 108 via the digital signal processing circuit 107 and memory control circuit 106; otherwise, data obtained by A/D conversion in the A/D converter 105 is written thereto directly via the memory control circuit 106.

The memory 108 stores data displayed on the display device 110. The data recorded in the memory 108 is output and displayed on the display device 110, such as a TFT, LCD, etc., via the D/A converter 109. Moreover, the memory 108, which stores captured still images and moving images, is provided with sufficient storage space for storing a prescribed number of still images and moving images of a prescribed duration. This enables high-speed writing of large quantities of images to the memory 108 even in case of panoramic imaging and burst imaging, during which multiple still images are captured in a continuous manner. Moreover, the memory 108 can also be used as a workspace for the system control circuit 112. It should be noted that the apparatus may be configured to use an interface 111 to write the captured still images and moving images to CD-ROMs, Floppy™ disks, hard disks, magnetic tape, magneto-optical disks, nonvolatile memory cards, or other storage media.

The consecutive display of the captured image data on the display device 110 makes it possible to implement electronic viewfinder functionality. Moreover, the display device 110 can turn the display ON and OFF at any time in accordance with instructions from the system control circuit 112 and when the display is turned OFF, the electric energy consumed by the image capturing apparatus 100 can be significantly reduced in comparison with the ON-state. Moreover, in response to program execution, the system control circuit 112 displays the operating state, messages, etc. on the display device 110 using characters, images, and the like.

The numeral 111 designates an interface that connects memory cards, hard disks, and other storage media to the image capturing apparatus 100. Moreover, the interface 111 can be used to transfer image data and management information attached to the image data between the apparatus and other computers, as well as between the apparatus and peripheral equipment such as printers, etc. Configuring the interface 111 for use with media conforming to standards such as PCMCIA cards and CF (Compact Flash™) cards permits information transfer between the apparatus and external devices based on connecting various communication cards. These various communication cards include, for instance, LAN cards and modem cards, USB cards, IEEE1394 cards, P1284 cards, SCSI cards, PHS and other communication cards.

The system control circuit 112 controls the overall operation of the image capturing apparatus 100. A memory (not shown) provided in the system control circuit 112 stores programs used in the operation of the system control circuit 112, or constants, variables, and programs etc. used for recognizing the facial expressions or faces of specific subjects. It should be noted that these constants, variables, and programs, etc. stored in the memory of the system control circuit 112 can be modified using CD-ROMs, floppy disks, hard disks, magnetic tape, magneto-optical disks, nonvolatile memory cards, etc. Moreover, instead of storing them in the memory, the data and programs used in the operation of the system control circuit 112 or for recognizing the facial expressions or faces of specific subjects may be read from the above-mentioned storage media etc. and executed. The invention, however, is not limited to the above-described methods.

The exposure control circuit 113 controls the diaphragm device and shutter device of the light amount adjustment device 102. The focus control circuit 114 controls the focusing and zooming of the imaging lens group 101. The exposure control circuit 113 and the focus control circuit 114 are controlled using the TTL method. Namely, the system control circuit 112 exercises control over the exposure control circuit 113 and the focus control circuit 114 based on the results of operations performed by the digital signal processing circuit 107 on the captured image data.

Figure 2:
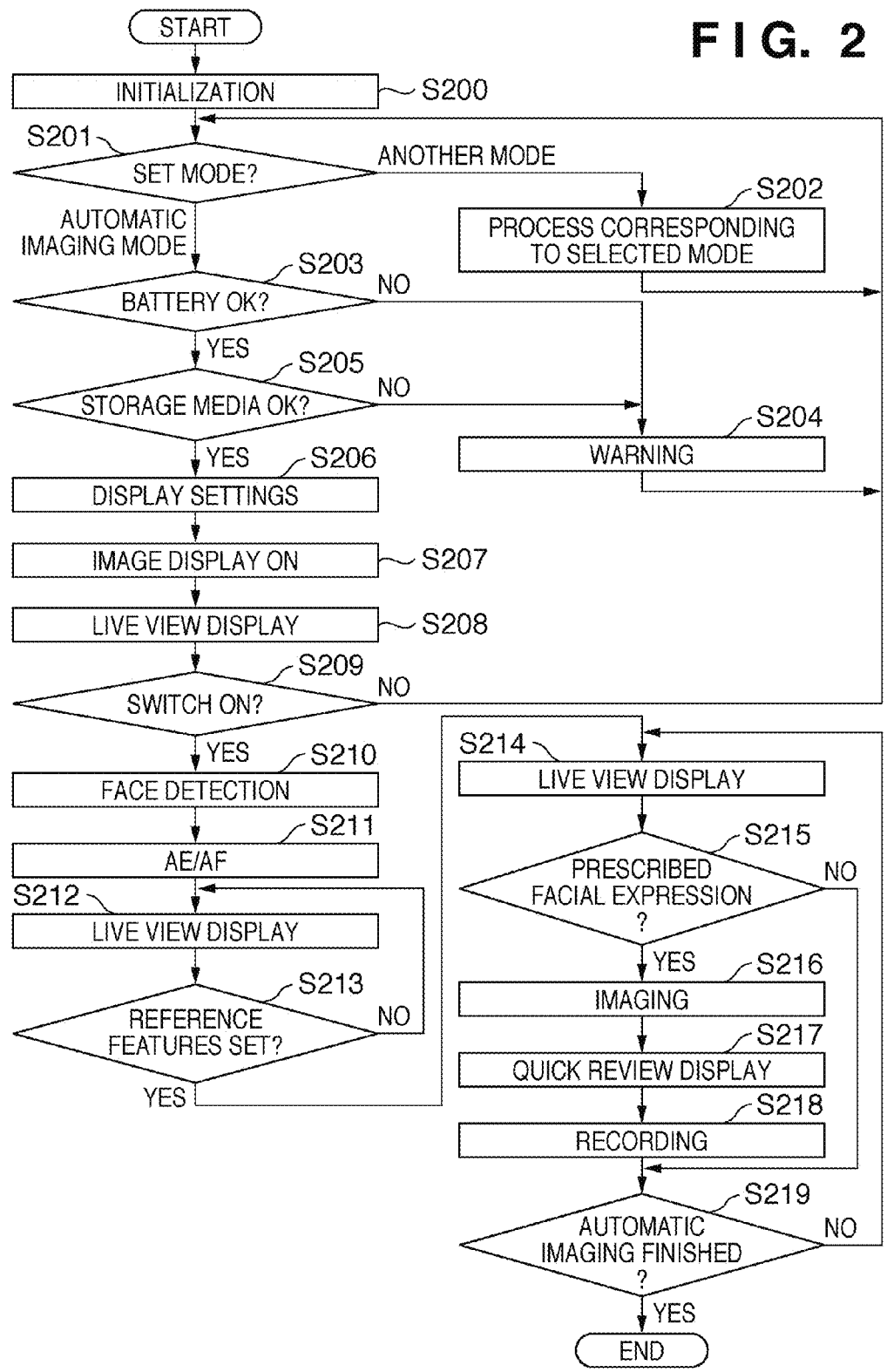
FIG. 2 is a flow chart illustrating the overall operation of the image capturing apparatus according to the first embodiment.

The overall operation of the image capturing apparatus 100 (electronic camera) according to this embodiment is explained below with reference to the flow chart of FIG. 2. It should be noted that the program used for executing the process illustrated in FIG. 2 is stored in the memory (not shown) of the system control circuit 112 and the process is executed under the control of the system control circuit 112.

When this process is initiated at power up, first of all, in step S200, the system control circuit 112 initializes various flags and control variables in the internal memory. In step S201, the system control circuit 112 detects the mode setting state of the image capturing apparatus 100 and advances the process to step S203 if it is set for the automatic imaging mode or to step S202 if it is set for another mode. It should be noted that in the automatic imaging mode, imaging (captured image recording operations) is performed at moments when the facial expression on the subjects face matches the prescribed facial expression (a smiling face in the present embodiment). In step S202, the system control circuit 112 executes a process corresponding to the selected mode and goes back to step S201 when the process is terminated.

On the other hand, if it is set for the automatic imaging mode, in step S203, the system control circuit 112 determines whether the remaining power supply capacity or operating situation will create problems for the operation of the image capturing apparatus 100. If the system control circuit 112 determines that problems will arise, in step S204, it uses the display device 110 to issue a prescribed warning message using images and sounds and then directs the process back to step S201.

If in step S203 it is determined that there are no problems associated with power supply, the process advances to step S205. In step S205, the system control circuit 112 determines whether the operating state of the storage media will create problems for the operation of the image capturing apparatus 100, in particular, for the operations of recording and reproduction of image data onto and from the storage media. If it is determined that problems will arise, the process advances to the above-described step S204. In step S204, the system control circuit 112 uses the display device 110 to issue a prescribed warning message using images and sounds and then directs the process back to step S201.

If in step S205 it is determined that there are no problems associated with the storage media, the process advances to step S206. In step S206 the system control circuit 112 uses images and sounds to present a user interface (referred to as UI below) with various setting states for the image capturing apparatus 100. It should be noted that if the image display of the display device 110 is turned ON, the display device 110 may be used for displaying an UI with various setting states for the image capturing apparatus 100 using images and sounds. Various user-defined settings are set in this manner.

Next, in step S207, the system control circuit 112 sets the image display of the display device 110 to the ON state. Furthermore, in step S208, the system control circuit 112 sets it to a live view display state for consecutive display of captured image data. It should be noted that in the present embodiment images obtained by the imaging element 103 are sequentially stored in the memory 108. The system control circuit 112 possesses image input functionality for sequentially accepting the images in chronological order. In this live view display state, image data consecutively written to the memory 108 are consecutively displayed by the display device 110, thereby implementing an electronic viewfinder function.

In step S209, the system control circuit 112 ascertains whether the shutter switch (not shown) has been pressed by the user, that is, the photographer. If the shutter switch has not been pressed, the process goes back to step S201. If the shutter switch has been pressed, imaging is not performed immediately and the system control circuit 112 executes a face detection process in step S210. Subsequently, in step S211, the system control circuit 112 effects the prescribed AE/AF control based on the results of the face detection process of step S210. Furthermore, an imaging process (a process, in which prescribed facial expressions are automatically detected and imaging is carried out) is carried out in the automatic imaging mode in response to prescribed operational instructions in the order of steps S212-219 described below.

[Regarding Face Detection Process (S210)]

The face detection process employs training-based methods represented, for instance, by neural networks and support vector machines. Moreover, it employs methods, in which locations having features with physical shapes such as the eyes, the nose, etc. are extracted from image areas based on template matching. In addition, there are techniques such as the one described in P. Viola and M. Jones et al., Rapid Object Detection Using a Boosted Cascade of Simple Features, in Proc. of CVPR, vol. 1, pp. 511-518, December, 2001. Furthermore, there are techniques, such as the ones described in Japanese Patent Laid-Open Nos. 10-232934 and 2000-48184, in which the color of the skin, the shape of the eyes, and other image features are detected and analyzed using statistical methods. The present embodiment uses a method, in which a face classifier is built by training a neural network on facial images and nonfacial images. Moreover, it should be noted that when a neural network-trained face classifier is used, neurons in the vicinity of the location where a face is present are brought into a firing state. For this reason, in addition to the face detection position, face detection reliability, etc. may be computed based on the intensity and number of neuron firings. The term face detection reliability refers to a value representing the degree in which detected face detection position etc. can be trusted. The higher the value of face detection reliability, the higher the probability that a face is present. For instance, a method exists, in which the position of the neuron with the largest output value is used as the face detection position and, in order to determine face detection reliability, the maximum output value is normalized to a prescribed value (e.g. 0–1) by applying a prescribed function and the value obtained from the maximum output value (e.g. 0–1) is used as the face detection reliability "as is". It should be noted that the face detection position and the region surrounding it are referred to as the face region.

It should be noted that, as far as face detection reliability is concerned, there is a method, in which the reliability of face detection is set to "1" if the number of neurons equal to or exceeding a fixed threshold value is not less than a prescribed number N1. Also, the reliability of face detection is set to 0.6 if it is not less than a prescribed number N2, and to "0" in all other cases. Moreover, a method may be used, in which the reliability of face detection is computed by applying a prescribed function to the number of neurons equal to or exceeding a fixed threshold value. In addition, different techniques may be used to determine the face position detection position and face detection reliability, such as the method, in which face detection reliability is computed by applying a prescribed function to the sum of neuron output values in the top N3% closest to the maximum of the neuron values.

Referring back to FIG. 2, the process of steps S212-S213 or steps S214-S219 is subsequently executed on images input in chronological order from the imaging element 103. In steps S212-S213, prescribed features are automatically extracted as reference features in accordance with facial status information-based timing and, in steps S214-S219, facial expression determination is carried out using the extracted reference features. In other words, the reference feature setting process in step S213 serves to determine the start of facial expression determination process in step S215. First of all, in step S212, the system control circuit 112 displays captured image data using live view display. Then, in step S213, a process is carried out wherein optimum reference features used in the facial expression recognition are automatically extracted and set, and, at the same time, it is determined whether reference features have been successfully set. The method used for automatically extracting reference features is explained below.

[Process of Extraction of Reference Features used for Facial Expression Recognition]

Figure 3:
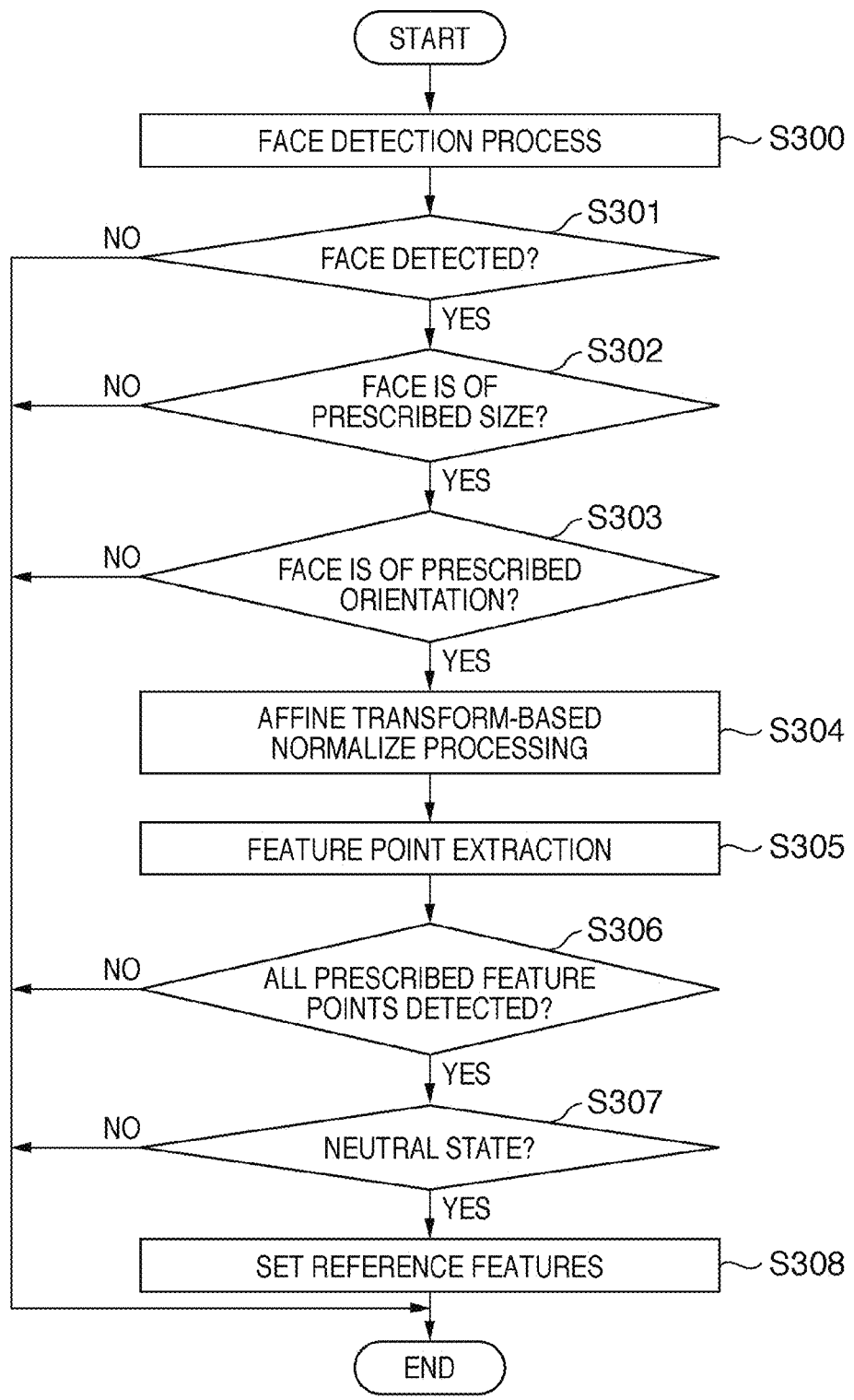
FIG. 3 is a flow chart illustrating the details of the reference feature setting process (step S213) according to the first embodiment.

FIG. 3 is a flow chart illustrating a process, during which reference features considered as the optimum reference for use in the facial expression recognition are automatically extracted and set. It should be noted that while in the following embodiments the hereinafter explained features extracted while in the neutral state are used as the optimum reference features, features obtained from specific facial expression states other than the neutral state may also be used as the reference features.

In step S300, using the above-described face detection process, the system control circuit 112 again carries out face position detection and face detection reliability computation as described above. This is due to the fact that the position of the subjects face may have been varied from the position occupied during AE/AF. Moreover, here, the position of the right and left eyes and the position of the mouth are detected using a representative eye template and mouth template applied around the detected face position. In step S301, the system control circuit 112 uses face detection reliability to check whether a face has been detected. If the face detection reliability is not less than a prescribed value, in other words, if it is ascertained that a face has been detected, the process advances to step S302. If the face detection reliability is less than a prescribed value, in other words, if it is not ascertained that a face has been detected, this process terminates. In step S302, the system control circuit 112 computes the size of the face using the position of the right and left eyes detected in step S300. If the computed size of the face is within the prescribed size, the process advances to step S303.

Figure 4:
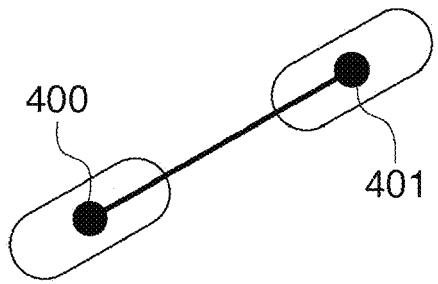
FIG. 4 is a diagram illustrating exemplary detected right and left eyes.

For instance, the system control circuit 112 computes the interocular distance based on the detected positions 400, 401 of the right and left eyes as shown in FIG. 4 and uses the interocular distance to compute the size of the face. Then, if it is determined in step S302 that the computed size is outside of the prescribed size, this process terminates. In step S303, the system control circuit 112 computes the orientation of the face using the detected positions 400, 401 of the right and left eyes detected in step S300. In step S303 the orientation (amount of in-plane rotation) of the face is computed from the orientation of a straight line connecting the positions of the two eyes as shown, for instance, in FIG. 4. If the computation results show that the orientation of the face is within the prescribed orientation, the process advances to step S304. If in step S303 it is determined that the orientation of the face is outside of the prescribed orientation range, the process is terminated. In step S304, the system control circuit 112 uses the detected positions 400, 401 of the two eyes in FIG. 4 to perform affine transform-based normalize processing, whereby the interocular distance is changed to the prescribed distance and the orientation of the face is changed to the prescribed orientation. As described above, in steps S301-S303, the validity of the detected face is determined based on the detected facial size, orientation and reliability, and if it is determined to be valid, the following process (neutral state determination) is carried out.

Figure 5:
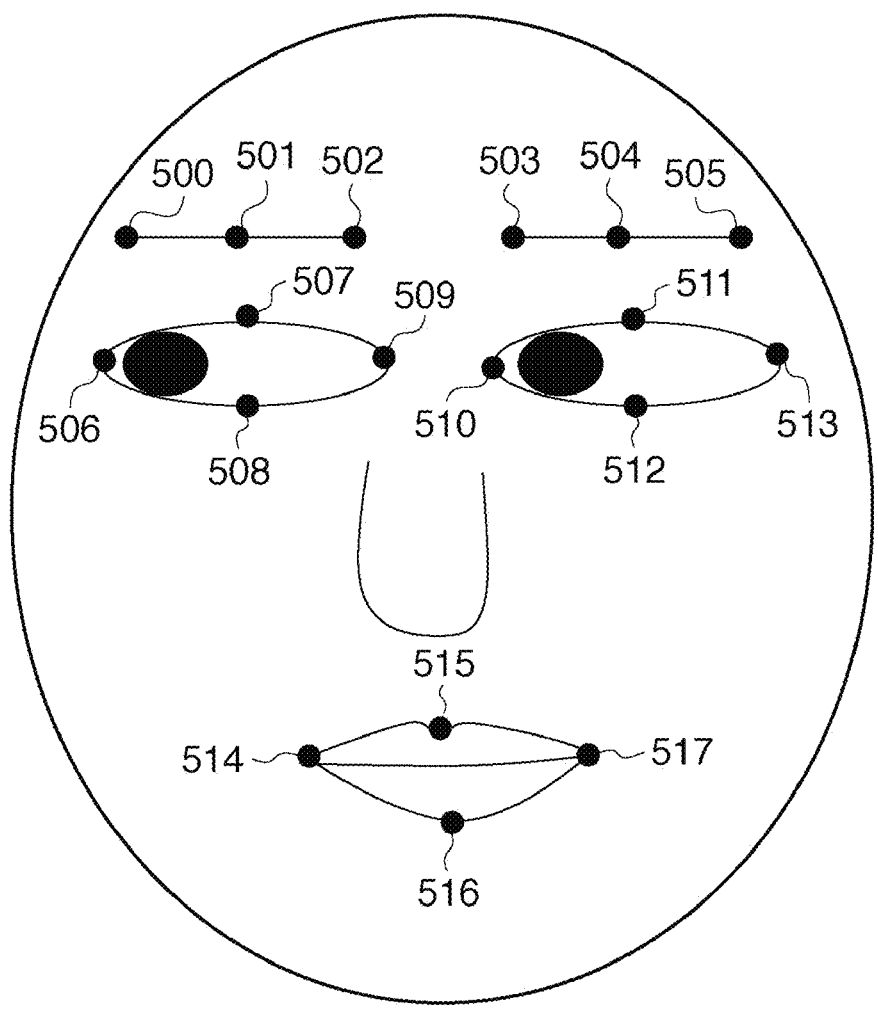
FIG. 5 is a diagram illustrating exemplary detected feature points.

In step S305, the system control circuit 112 performs extraction of facial feature points 500-517 as shown in FIG. 5. While there are various techniques used for feature point extraction, in the present embodiment the method of extraction consists in setting prescribed ranges for extracting feature points and using a neural network for detecting feature points within the set ranges. A neural network trained in advance on feature point image data in a manner similar to face detection is used as the neural network.

Figure 6:
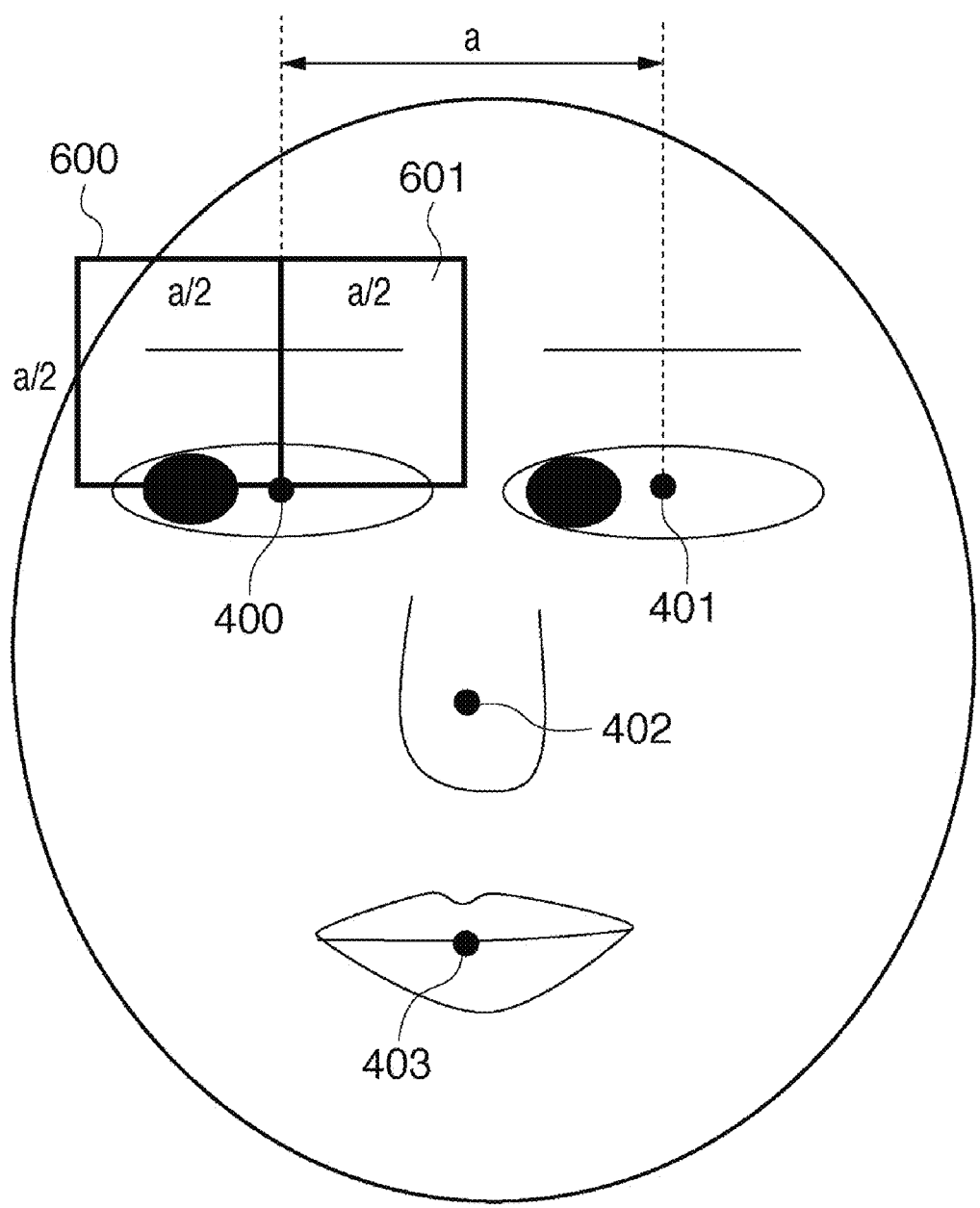
FIG. 6 is a diagram illustrating an exemplary region set up for detecting feature points 500, 502.
Figure 7:
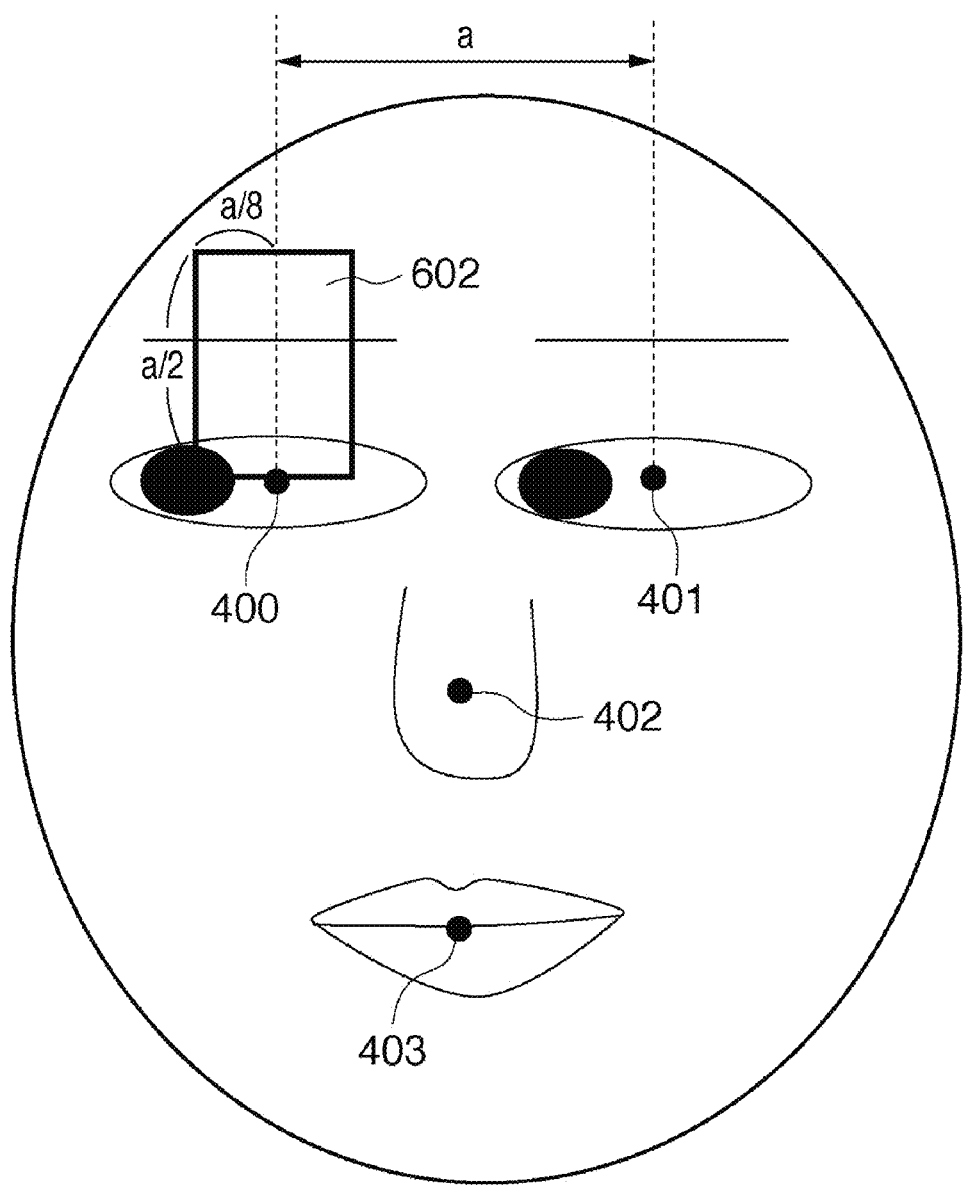
FIG. 7 is a diagram illustrating an exemplary region set up for detecting feature point 503.
Figure 8:
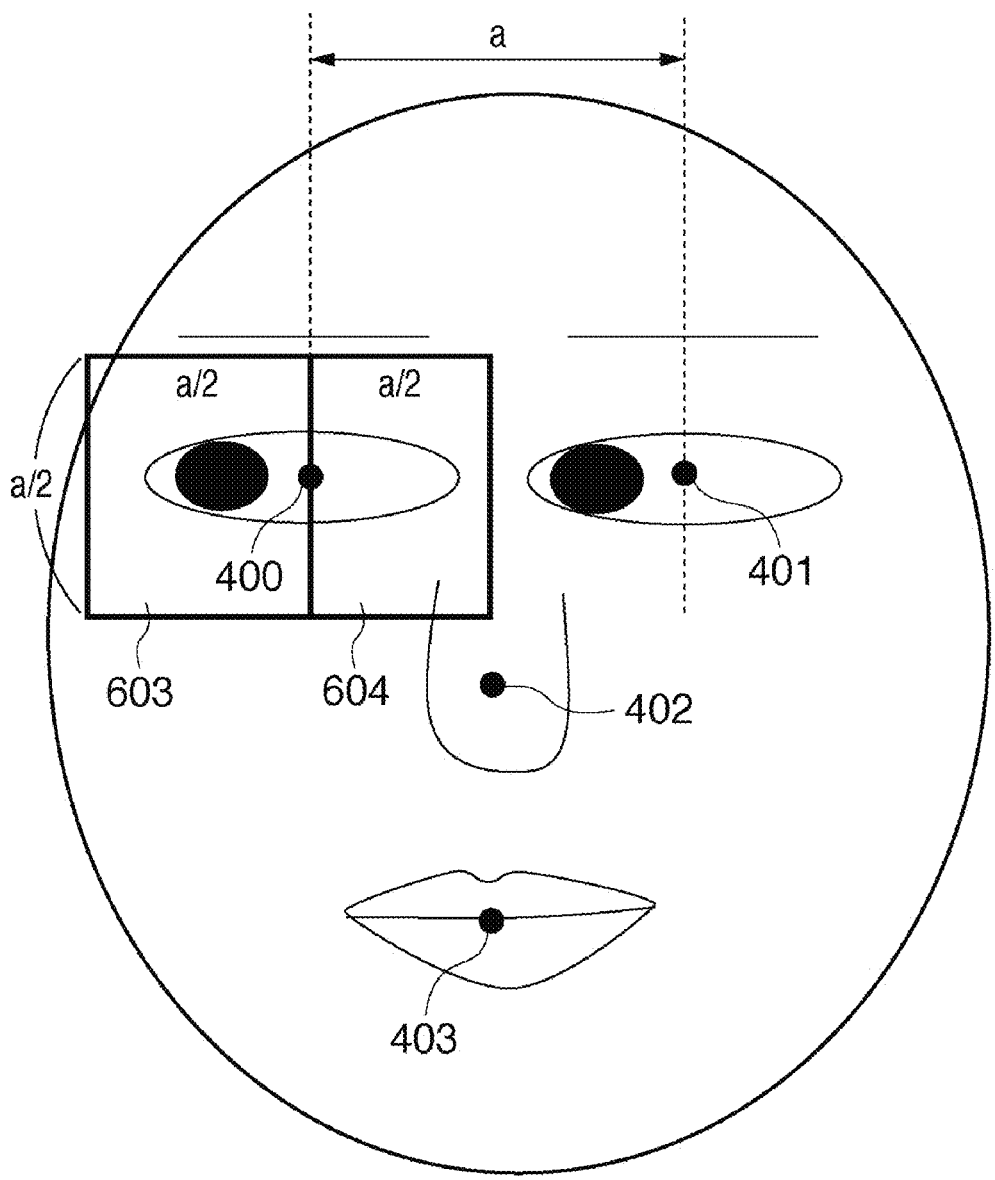
FIG. 8 is a diagram illustrating an exemplary region set up for detecting feature points 506, 509.
Figure 9:
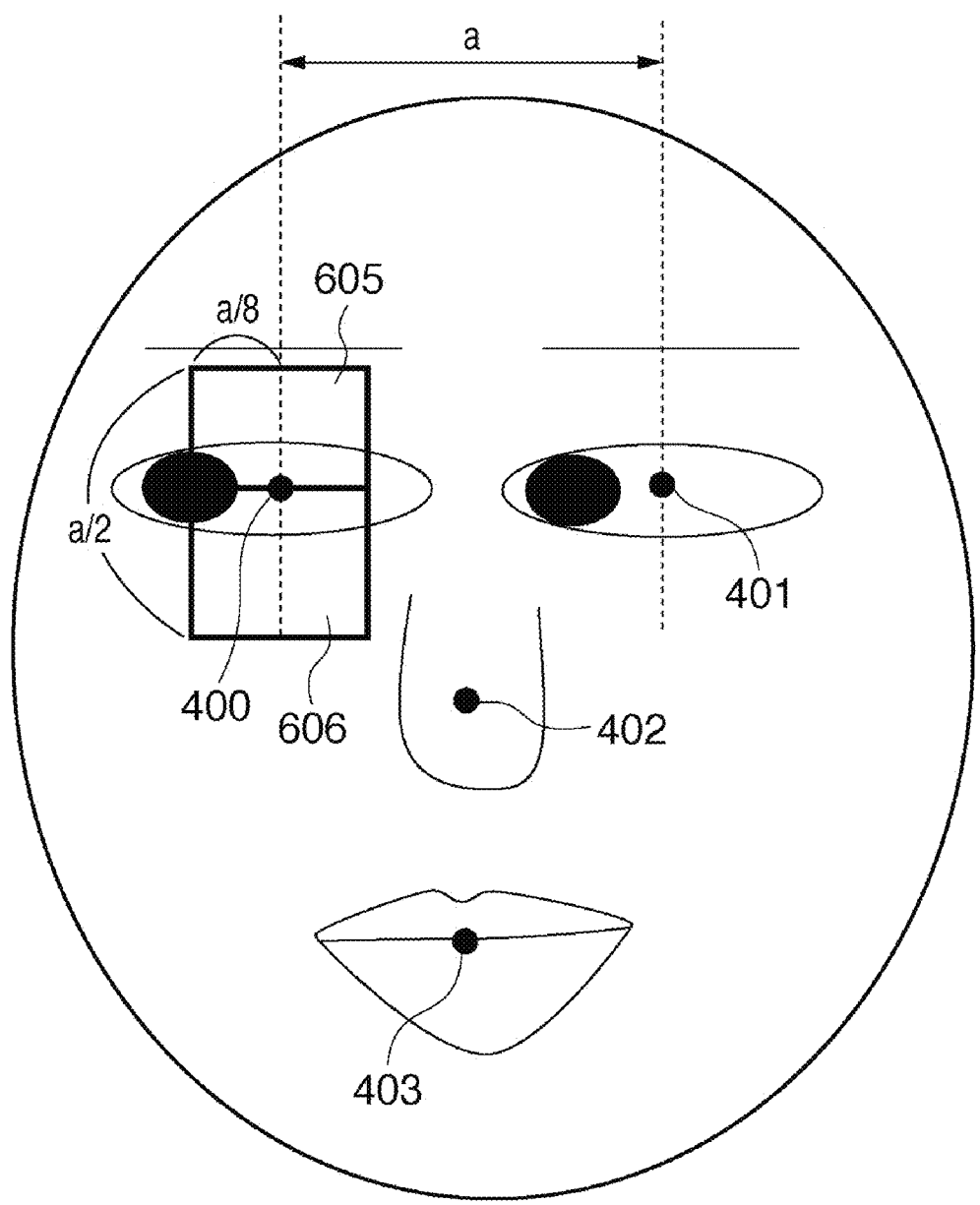
FIG. 9 is a diagram illustrating an exemplary region set up for detecting feature points 507, 508.
Figure 10:
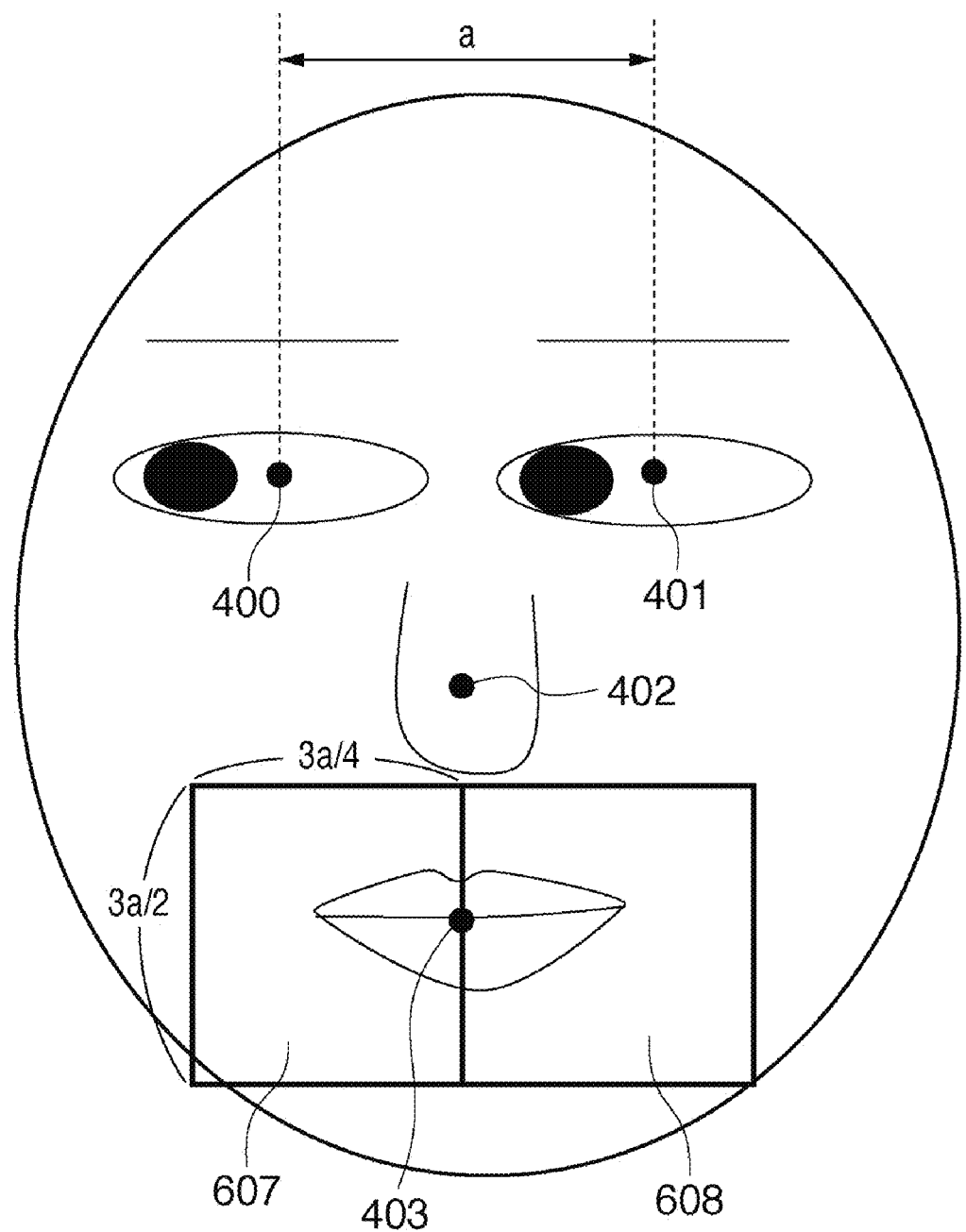
FIG. 10 is a diagram illustrating an exemplary region set up for detecting feature points 514, 517.
Figure 11:
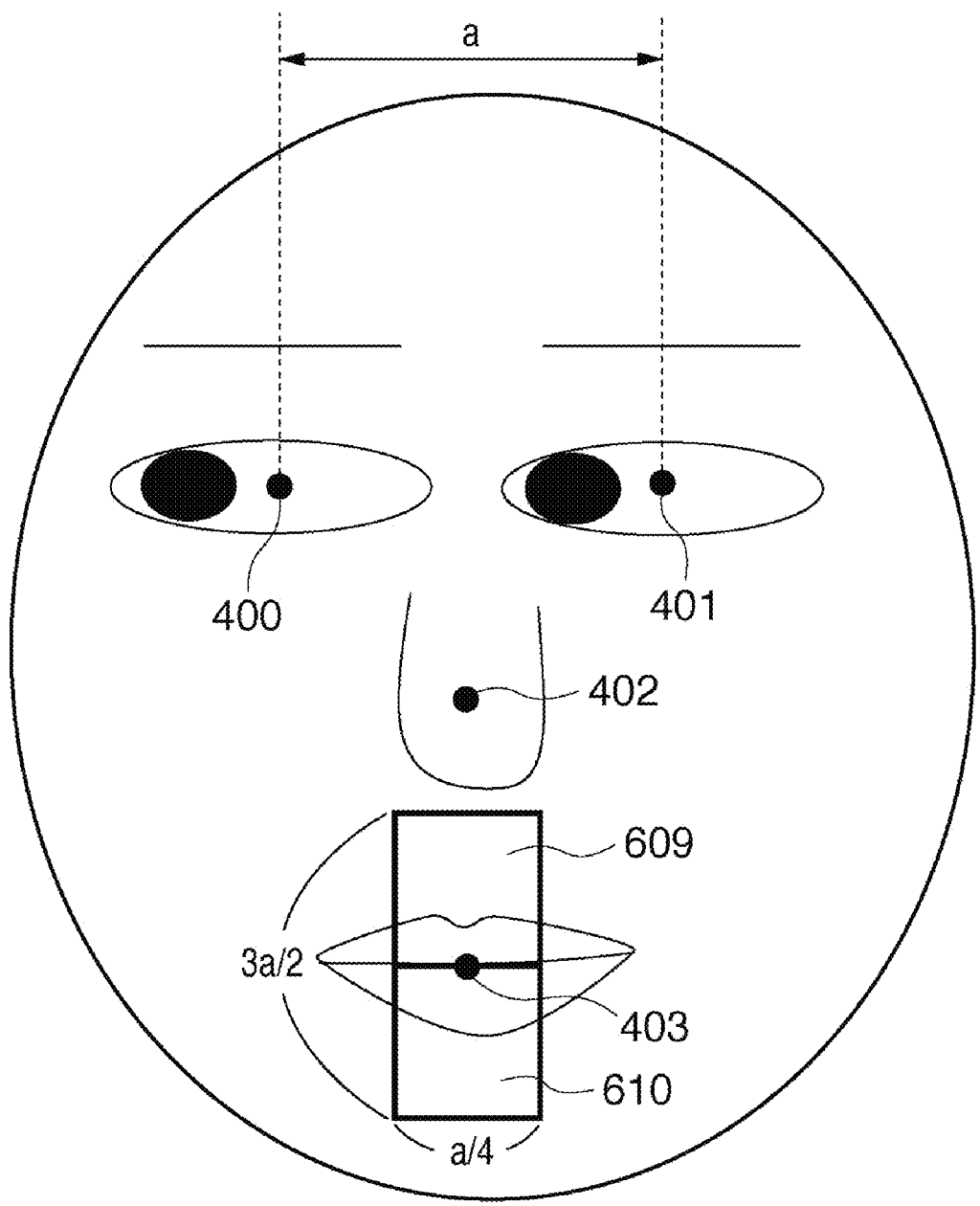
FIG. 11 is a diagram illustrating an exemplary region set up for detecting feature points 515, 516.

The detection ranges of the feature points are set in the following manner using the detection positions of both eyes 400, 401, face detection position 402 (nose position), and mouth detection position 403 (see FIG. 6). For instance, ranges 600, 601 are set in the detection range of the feature points 500, 502 using the interocular distance a and the left eye detection position 400 as shown in FIG. 6. Moreover, the detection range of the feature points 503, 505 is similarly set using the interocular distance a and the right eye detection position 401. Moreover, a range 602 is set in the detection range of the feature point 501, as shown for instance in FIG. 7, with the detection range of the feature point 504 also set in a like manner. Ranges 603, 604 are set as the detection range of the feature points 506, 509, as shown for instance in FIG. 8, with the detection range of the feature points 510, 513 also set in a like manner. Ranges 605, 606 are set in the detection range of the feature points 507, 508, as shown for instance in FIG. 9, with the detection range of the feature points 511, 512 also set in a like manner. Ranges 607, 608 are set as the detection ranges of the feature points 514, 517, as shown for instance in FIG. 10. Moreover, ranges 609, 610 are set as the detection ranges of the feature points 515, 516, as shown for instance in FIG. 11.

It should be noted that numerous neurons fire in the vicinity of the correct position of each feature point when the neural network is used. Thus, the present embodiment uses a method, in which the extraction of the feature point positions of the mouth is carried out by computing a centroid of neuron values exceeding a prescribed threshold value. It should be noted that the position computation method and set ranges are not limited to the present embodiment.

Referring back to FIG. 3, in step S306, it is ascertained whether all the prescribed feature points have been detected. If all the feature points have been detected, in other words, if all the feature points 500-517 of FIG. 5 have been detected, the process advances to step S307. If it has not been possible to detect all the feature points, this process terminates. In step S307, the system control circuit 112 determines whether the facial expression state is neutral based on the amount of dynamic variation in the mouth feature points 514-517 among the feature points 500-517 in FIG. 5. The method of neutral state determination is explained below.

Figure 12:
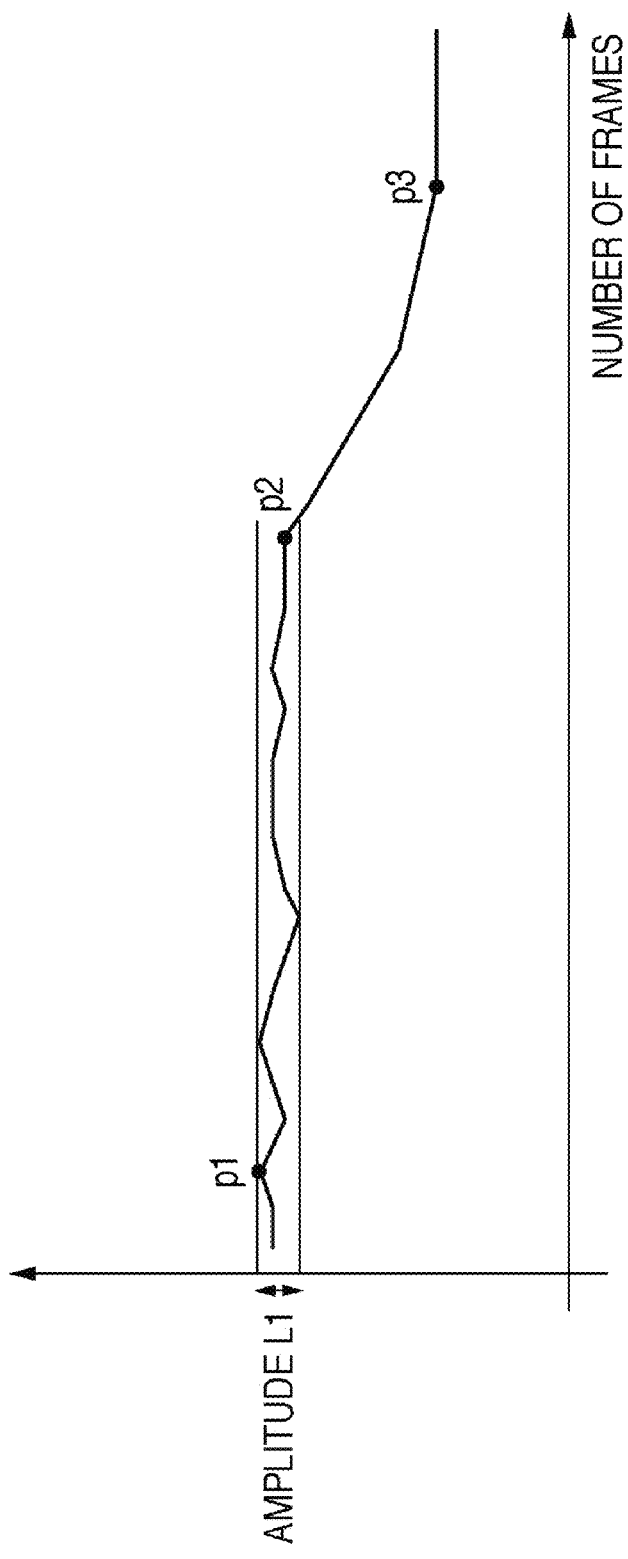
FIG. 12 is a diagram showing a graph illustrating variation in the y coordinate of the feature points 514, 517 in relation to the face detection position.

FIG. 12 is a graph illustrating variation in the y coordinate of the mouth feature points 514 and 517 with respect to the face detection position 402 of FIG. 6 in a case where a neutral state changes to a smiling facial expression. It should be noted that in FIG. 12, p1 and p2 correspond to frames associated with a neutral state and p2 and p3 to frames associated with a smiling face state. As can be seen from FIG. 12, in the neutral state between p1 and p2, the y-coordinate variation of the mouth feature points 514 and 517 with respect to the face detection position is limited to minute oscillations within a prescribed amplitude range L1. By contrast, in the smiling facial expression state between p2 and p3, the y-coordinate variation with reference to the face detection position 402 varies considerably because the y coordinates of the mouth feature points 514 and 517 approach the face detection position 402 as the cheek muscles are lifted. Although not illustrated in the drawings, the same is true of the mouth feature points 515 and 516, for which the y-coordinate variation of the mouth feature points 515 and 516 with reference to the face detection position 402 in the neutral state is limited to minute oscillations within a prescribed amplitude range (designated as L2). Thus, if the variation (amount of fluctuation) of the y coordinate of the mouth feature points with reference to the face detection position 402 stays within the prescribed amplitudes L1, L2 continuously for a prescribed number of frames (predetermined number of consecutive images), the state is determined to be neutral. The prescribed amplitudes L1, L2 are obtained in advance by analyzing large amounts of neutral expression data. In the present embodiment, the y-coordinate variation of the mouth feature points constitutes facial information that determines the timing of reference feature extraction.

It should be noted that the reason why minute oscillations take place in the neutral state is the slight shift of the mouth feature point detection position from the original correct position due to the influence of image noise and the like. Accordingly, so long as there is no misdetection of mouth feature point positions due to the influence of objects etc. concealing the mouth area, the y-coordinate variations of the mouth feature point positions with reference to the face detection position 402 in the neutral state is practically contained within a prescribed dispersion relative to the original correct mouth feature point positions. In step S307, a determination as to whether this state is neutral is made in this manner based on the amount of dynamic interframe variation of the prescribed feature points. Namely, a determination as to whether to start facial expression determination is made based on the coordinate values of feature points (in this embodiment, mouth feature points) constituting facial organs with reference to the detected facial position (face detection position 402). It is clear that distances between the specified facial position and the features constituting a facial organ may be used as an alternative.

It should be noted that, instead of setting prescribed amplitudes for extracting reference features in the above-described manner, one may set prescribed amplitudes for which no reference features are extracted. In other words, as described above, in case of extraction of reference features from a neutral state, reference features were extracted when the variation stayed within the prescribed amplitude continuously for a prescribed number of frames. However, in case of extraction of reference features from other facial expression states, the reference features may be extracted, not when the variation stays within the prescribed amplitude, but when the variation stays greater than the prescribed amplitude continuously for a prescribed number of frames. Moreover, the method of neutral state determination is not limited to the above-described determination conditions, that is, both the x coordinate and the y coordinate may be used and feature points other than mouth feature points may be used as well. Moreover, additionally, the open/closed state of the eyes may be used as facial information to extract reference features in accordance with the timing of the open-eyed state using the distance, and variation in the distance, between the feature point 507 (511) and feature point 508 (512). Moreover, in the same manner as with feature point extraction, pupil images may be used for training a neural network and the open/closed state of the eyes may be determined from the number of pupil neurons exceeding a fixed threshold value. For instance, the apparatus may be adapted to determine that reference feature setting should be performed (facial expression determination process should be initiated) when the number of detected pupil area pixels not less than a prescribed value. Moreover, the condition may be formulated as "continuously for a prescribed period of time" instead of "continuously for a prescribed number of frames".

Referring back to FIG. 3, if in step S307, based on the prescribed feature points, it is determined that the state is a neutral state, the process advances to step S308. If in step S307, based on the prescribed feature points, it is determined that the state is not neutral, the process is terminated. In step S308, the system control circuit 112 extracts and sets reference features used for facial expression determination. In this manner, in the present embodiment, based on detected facial image information (images depicting the area around the detected facial position), it is determined whether to initiate facial expression determination subsequent to step S214. Then, if it is determined that facial expression determination should be initiated for the facial expression determination, reference features serving as reference feature information are acquired based on the detected facial image information. Below, explanations are provided regarding reference features for a smiling facial expression as an example of a facial expression to be determined.

[Reference Features]

Facial Action Coding System (P Ekmanand W V Friesen, Facial Action Coding System (FACS) Manual, Palo Alto Consulting Psychologists Press, 1978) proposes the following definition of a smiling facial expression.

[Definition of a Smiling Facial Expression in FACS]

Cheek raising, lip corner retraction.

Figure 13:
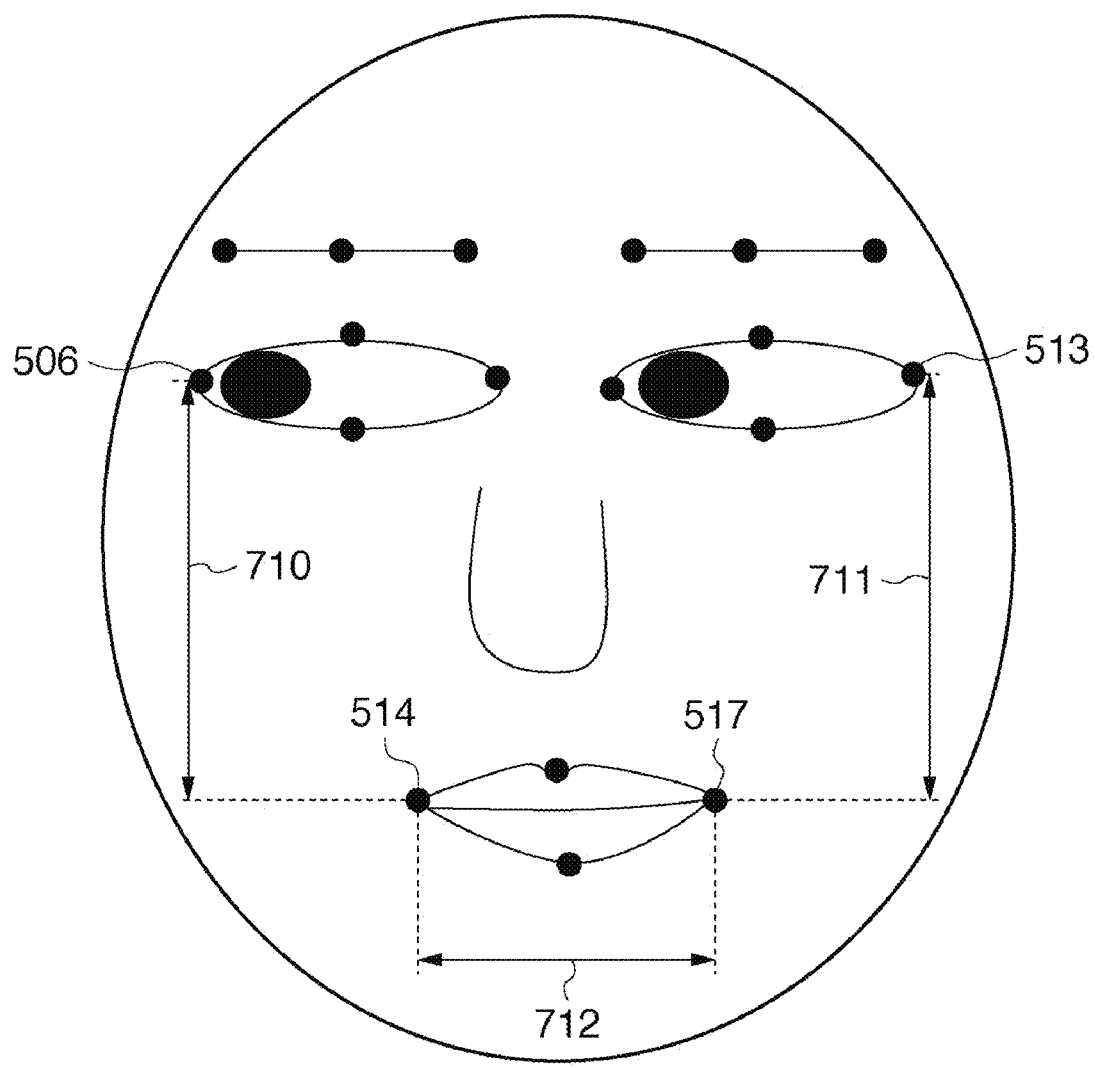
FIG. 13 is a diagram illustrating exemplary features used for determining a smiling facial expression, which is an exemplary facial expression.

In the present embodiment, as shown in FIG. 13, the respective amounts of variation in the distance between the y coordinates of the feature point 506 and feature point 514 (feature 710), the distance between the y coordinates of the feature point 513 and feature point 517 (feature 711), and the distance between the feature point 514 and feature point 517 in the x direction (feature 712), are used to determine a smiling facial expression. Accordingly, in the present embodiment, the "reference features" used when determining a smiling facial expression are the above-mentioned distances 710, 711, and 712 obtained from the facial image in the neutral state; they are referred to also as "features" below. In step S308, these features are extracted as reference features. As far features used to determine other facial expressions are concerned, one may determine features corresponding to the definition of each facial expression in the above-mentioned FACS and determine the facial expression using the determined features.

Figure 14:
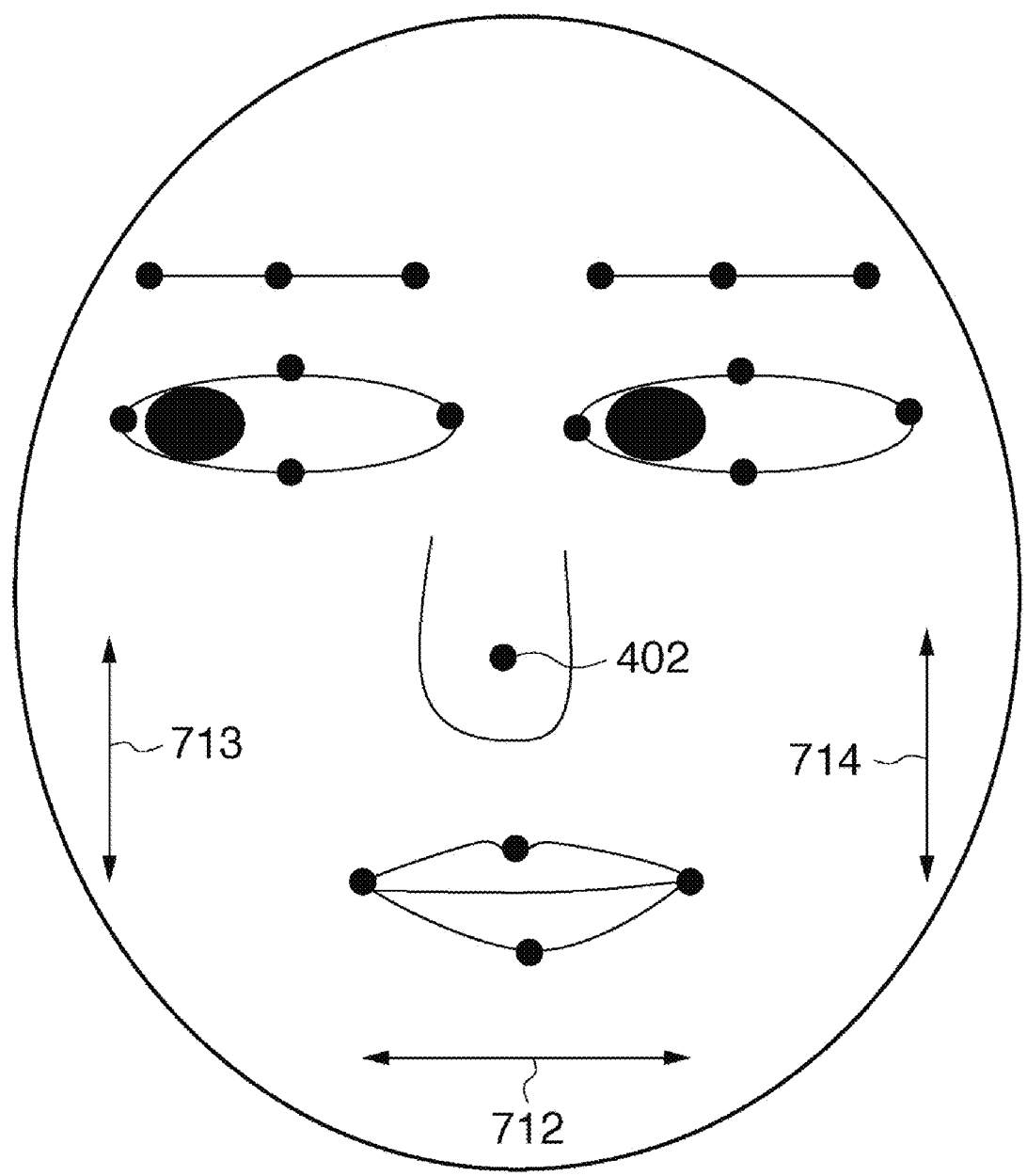
FIG. 14 is a diagram illustrating exemplary features used for determining a smiling facial expression, which is an exemplary facial expression.

It should be noted that when computing these distances, as shown in FIG. 14, one may compute distances 713, 714 (referred to also as features 713, 714 below) in the y-direction with reference to a prescribed position, for example, the face detection position 402. Moreover, the features used are not limited to the features described in the present embodiment.

If in step S213 it is determined that all prescribed reference features have been set, the process advances to step S214. On the other hand, if in step S213 it is determined that not all prescribed reference features have been set, the process goes back to step S212 and the system control circuit 112 provides a live view display of the next frame image. In step S214, the system control circuit 112 provides a live view display of the next frame image of the frame images with set reference features. In step S215, the system control circuit 112 carries out a facial expression recognition using an image that represents the same scene as the frame image displayed using live view display in step S214 but has a different resolution and a determination is made as to whether this is the prescribed facial expression. Namely, in step S215, feature information is extracted from the detected facial image information with respect to an image input after it is determined that a facial expression recognition should be initiated (after reference features have been set) in step S213. The facial expression is then determined based on the extracted feature information and the reference feature information. The facial expression determination process is explained below.

[Facial Expression Determination Process]

Figure 15:
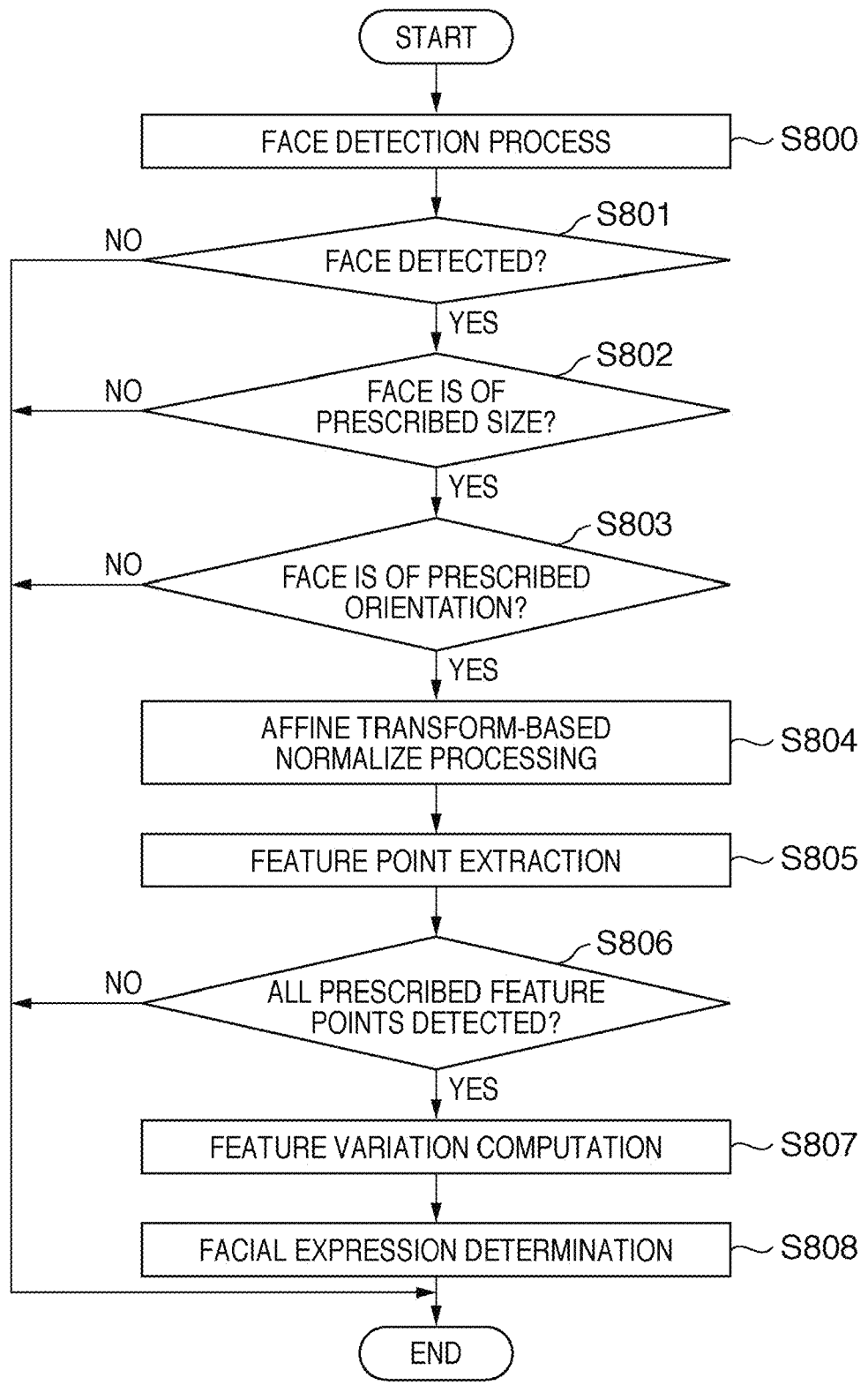
FIG. 15 is a flow chart illustrating the details of the facial expression determination process (step S215) according to the first embodiment.

FIG. 15 is a flow chart of the facial expression determination process. The processing performed in steps S800-S806 is the same as in steps S300-S306 in FIG. 3. Accordingly, during the facial expression determination process, the validity of the detected face is determined based on the size, orientation and reliability of the detected face (S801-S803). The processing below (facial expression determination) is then carried out if it is determined to be valid. In step S807, the system control circuit 112 first extracts features (the same type of features as the reference features 710, 711, and 712 in FIG. 13) from the current frame image. Next, variation features $v_1$, $v_2$, and $v_3$ of the features are computed by computing feature differences or ratios between the reference features extracted from the neutral facial image and the features extracted from the facial image of the current frame. Subsequently, in step S808, the system control circuit 112 uses the following equation to compute the degree of smiling facial expression from the weight and variation $v_1$, $v_2$, and $v_3$ of the features and the expression is determined to be a smiling facial expression if the SumScore is not less than a prescribed score and, on the other hand, it is determined that it is not a smiling facial expression if it is less than the prescribed score.

$$Score_N = g(w_N, v_N) \quad N: \text{feature number} \quad w: \text{feature weight}$$

$$SumScore = \sum_{i=0}^{N} Score_i \quad g: \text{score} - \text{computing function}$$

The above-described prescribed score-based determination is suitable when only a specific scene, that is, a specific facial expression is determined by the user by operating the camera. However, in case of determining a single prescribed facial expression among a series of facial expressions, there is a method, in which a score calculated for each facial expression and the facial expression with the highest calculated score is determined to be the prescribed facial expression. Moreover, there is a method based on neural networks utilizing final layers for facial expressions, or a method, in which facial expressions are determined using hidden Markov models (HMM), as in Japanese Patent No. 02962549.

Referring back to FIG. 2, if it is determined in step S215 that this is the facial expression of the subject (prescribed facial expression), the process advances to step S216. On the other hand, if in step S215 it is not determined that this is the facial expression of the subject, the process advances to step S219. In step S216, the system control circuit 112 performs an imaging operation, during which captured image data is written to the memory 108. When the imaging operation of step S216 ends, in step S217, the system control circuit 112 executes a quick review display operation by displaying the image taken in step S216. After reading out the image data written to the memory 108 and performing an image compression process in step S218, the system control circuit 112 then carries out a recording process, in which the compressed image data is written to storage media. It should be noted that image processing operations, such as an achromatizing process to render a high-luminance or low-luminance color less prominent, may be performed, if necessary, prior to the recording process. If it is detected in step S219 that the automatic imaging has ended, such as if there is another shutter switch depression, etc., the system control circuit 112 directs the process back to step S201, and the automatic imaging is terminated. On the other hand, if there is no indication that the automatic imaging has ended, the process goes back to step S214 and the automatic imaging is continued.

It should be noted that, in terms of the above-described feature point position, distance features, etc., average values for a predetermined number of frames may be used instead of values of each frame.

In the method above facial expressions are recognized after setting reference features required during facial expression recognition based on dynamic variation in the prescribed feature points.

It should be noted that while the explanations provided in the first embodiment referred to an electronic still camera, it goes without saying that the embodiment is equally applicable to video cameras, etc.

As explained above, the first embodiment can eliminate the following prior-art problems that greatly affect the accuracy of facial expression recognition: (1) time and labor is required in order to register neutral images in advance; (2) facial expressions can be recognized only for registered persons; (3) more memory areas are required because the number of images etc. that have to be registered depends on the number of persons subject to the facial expression recognition; (4) when the imaging environment during registration and imaging environment during facial expression recognition are different, facial expressions are sometimes impossible to recognize with accuracy due to the difference between the imaging environments; (5) the definition of the term "neutral image" varies among the users registering neutral images.

Embodiment 2

Figure 16:
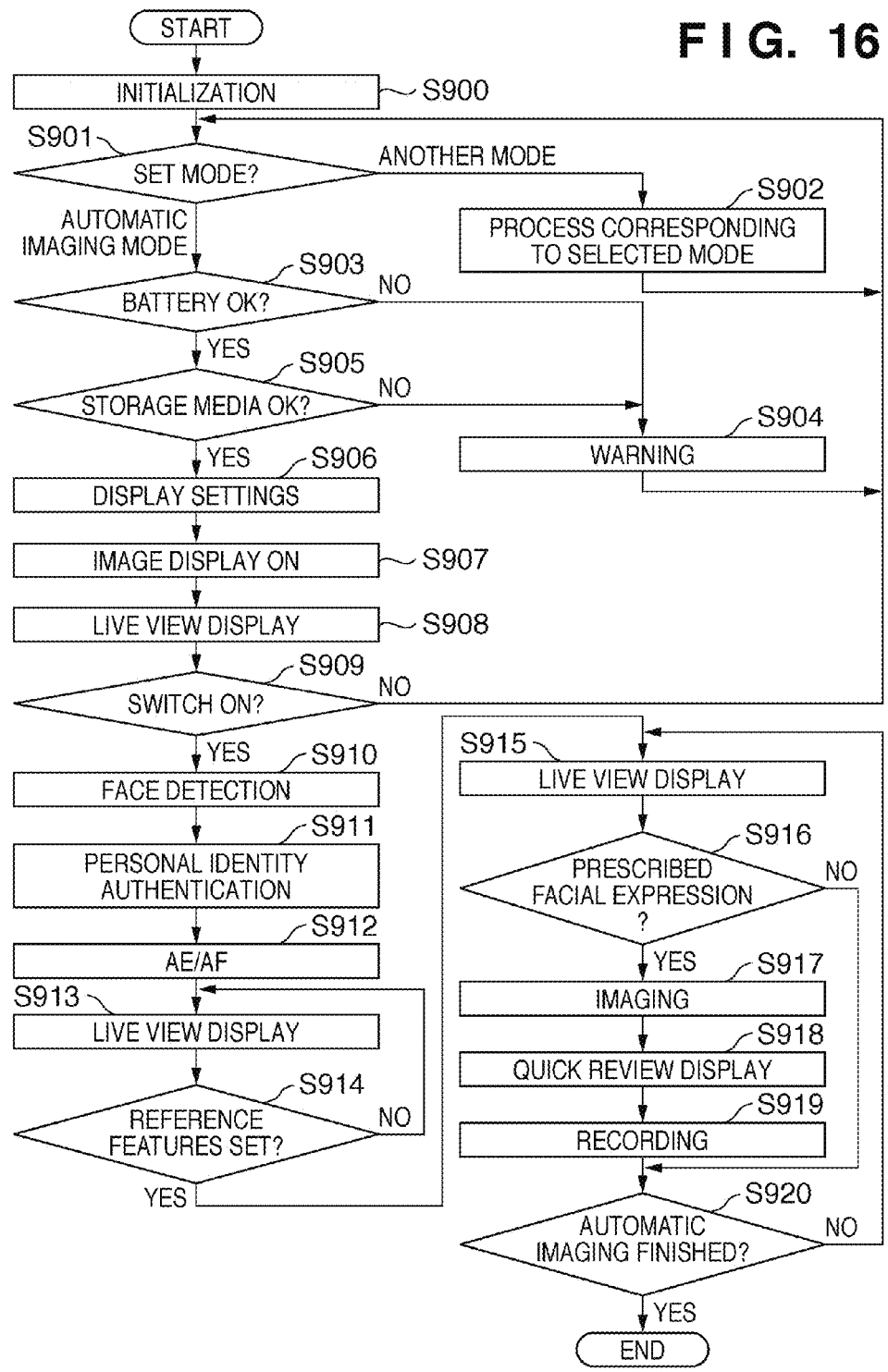
FIG. 16 is a flow chart illustrating the overall operation of the image capturing apparatus according to the second embodiment.

A second embodiment will be explained next. FIG. 16 is a flow chart illustrating the overall operation of the second embodiment. The explanations below are provided with reference to the flow chart of FIG. 16. The processing performed up to steps S900-S910 is the same as in the first embodiment (steps S200-S210). In addition, the processing performed in steps S915-S920 is also the same as in the first embodiment (steps S214-S219).

In step S911, the system control circuit 112 performs personal identity authentication for faces detected in step S910. The technology of personal identity authentication is based, for instance, on methods utilizing the mutual subspace technique described in Japanese Patent Laid-Open No. 2000-30065, or methods described in Japanese Patent Laid-Open No. 2003-323622, in which the face region is divided into multiple subregions and comparison is performed for each subregion. In the present embodiment we use the method described in Japanese Patent Laid-Open No. 2003-323622, in which the face region is divided into multiple subregions. It should be noted that images used for authentication may be registered immediately prior to imaging instead of being registered in advance. In step S912, the system control circuit 112 performs AE/AF for persons authenticated in step S911. In step S913, the system control circuit 112 provides a live view display in the same manner as in the first embodiment. In step S914, the system control circuit 112 makes a determination as to the neutral state and performs reference feature extraction. Although in step S914 reference features may be extracted using the same technique as in the first embodiment, in the second embodiment the reference features are extracted using a technique different from the first embodiment. Below, the method of reference feature extraction of the second embodiment is explained by referring to the flow chart of FIG. 3.

[Process of Extraction of Reference Features used for Facial Expression Recognition]

Figure 17:
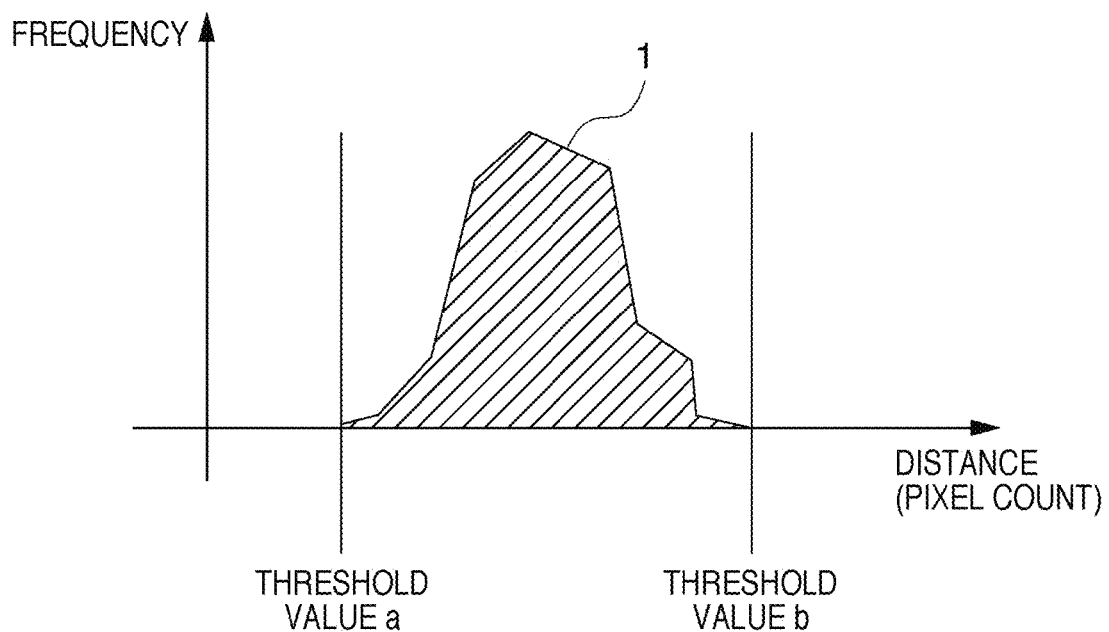
FIG. 17 is a diagram illustrating an exemplary method, in which histograms are employed to determine threshold values for neutral state determination.
Figure 18:
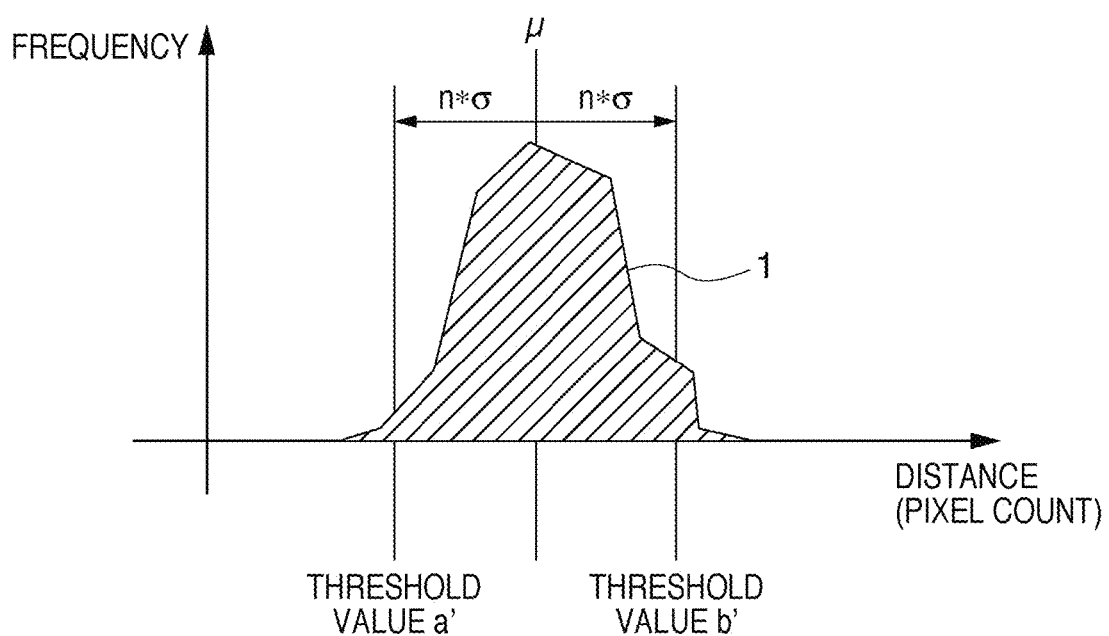
FIG. 18 is a diagram illustrating another exemplary method, in which histograms are employed to determine threshold values for neutral state determination.

The process is identical to the first embodiment up to steps S300-S306 of FIG. 3. In step S307, it is determined that the state is a neutral state if the features 712, 713, and 714 of FIG. 14 are within the prescribed range. The following method is suggested as a method for determining the prescribed range. A large quantity of data on neutral expressions is prepared in advance and a histogram 1, such as the one in FIG. 17, is created for the feature 712 of FIG. 14, and a histogram 2 and histogram 3 (not shown) are created for the features 713 and 714 in a similar manner. Next, a threshold value a and a threshold value b are determined based on the histogram 1 of FIG. 17 in such a manner that all features 712 are included. In a similar manner, threshold values c and d (not shown) are determined based on the histogram 2 such that all the features 713 are included and threshold values e and f (not shown) are determined based on the histogram 3 such that all the features 714 are included. A facial expression is determined to be neutral if all the features fall between the threshold values. It should be noted that, for the threshold value a and threshold value b, one may use a method, in which an average $\mu$ and dispersion $\sigma$ of the features are computed and values spaced apart from the average $\mu$ by a predetermined dispersion $n*\sigma$ ($\sigma$: dispersion, n: constant) are used as threshold values a' and b' and that other techniques may also be used to determine the threshold values. The features used here are of course not limited to the features used in the second embodiment.

The processing performed here starting from step S308, as well as in steps S915-S920 of FIG. 16, is identical to that of the first embodiment.

As described above, in the second embodiment, criteria are held by statistical processing of features in multiple facial images and facial expression determination is initiated when features obtained from detected facial image information are within a predetermined range from the criteria. For this reason, the second embodiment makes it possible to determine a neutral state using predetermined features obtained from a single frame image rather than determining a neutral state from variation in feature points across several frames, as in the first embodiment.

It should be noted that while the explanations provided in the second embodiment referred to an electronic still camera, it goes without saying that the embodiment is equally applicable to video cameras, etc. Moreover, instead of an image capturing apparatus, it may be adapted to extraction of neutral state images of specific persons from a database containing a large amount of images and subsequent extraction of images of specific persons with prescribed facial expressions.

Embodiment 3

A third embodiment will be explained next. The flow chart describing the overall operation of the embodiment is identical to the one used in the second embodiment (FIG. 16).

Figure 19:
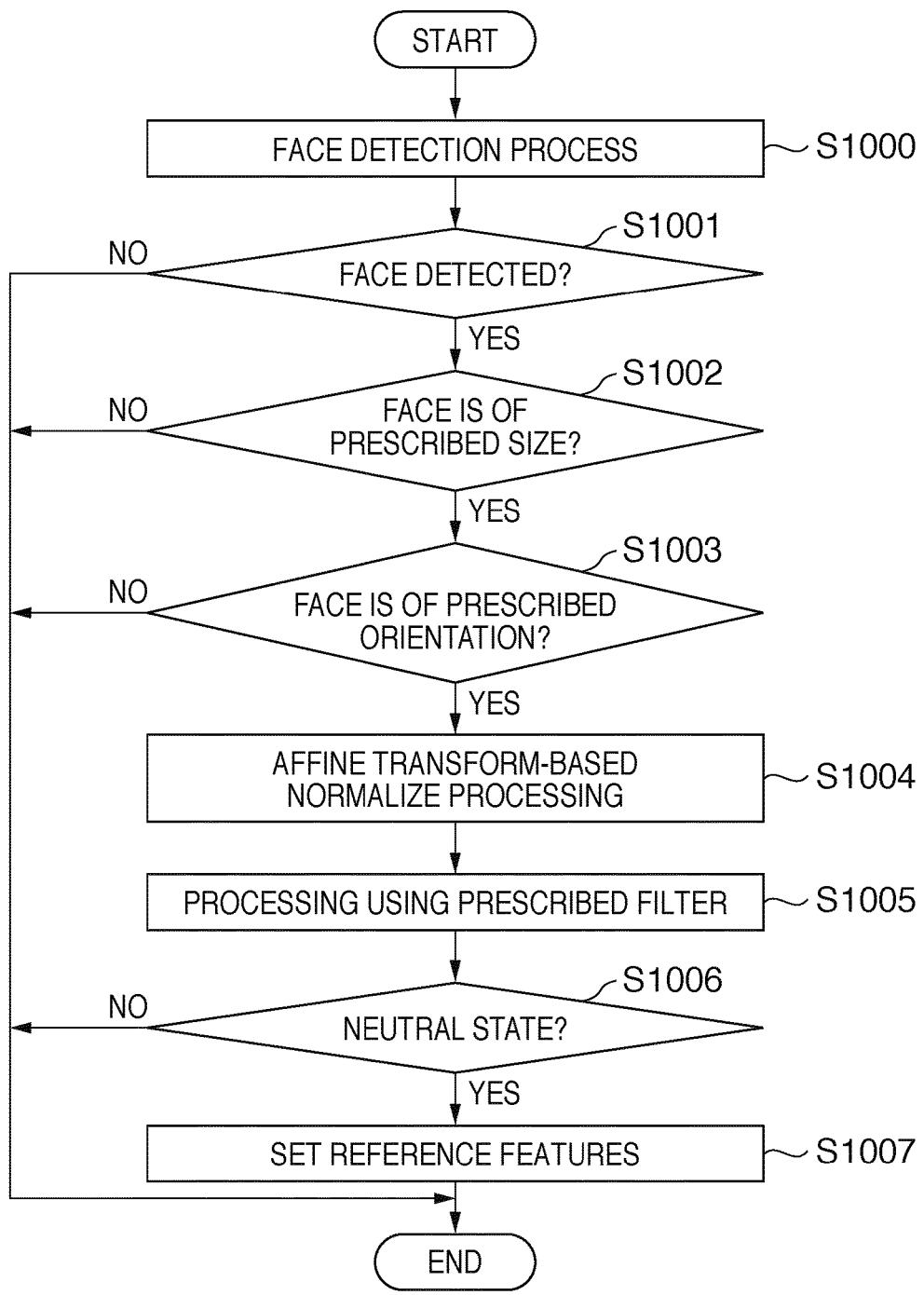
FIG. 19 is a flow chart illustrating the details of the reference feature setting process according to the third embodiment.

FIG. 19 is a flow chart representing step S914 of FIG. 16, i.e. the reference feature setting process of the third embodiment. Up to step S1000-step S1004 in FIG. 19, the process is identical to the first and second embodiments, namely, steps S300-S304.

In step S1005, the system control circuit 112 first sets regions for spatial filtering. For instance, the spatial filtering regions are regions 1100, 1101, and 1102 in FIG. 20. These regions are determined with reference to the eye detection positions 400, 401, face detection position 402, and mouth detection position 403. Next, in order to determine whether this is a neutral state, spatial filtering is performed in region 1102 of FIG. 20. The spatial filter used may be, for example, a Sobel filter for horizontal and vertical edge detection, but it is not limited to Sobel filters.

In step S1006, the system control circuit 112 uses the output of the spatial filter in step S1005 to determine whether this is a neutral state. FIG. 21 illustrates results obtained by performing Sobel filtering to detect horizontal and vertical edges in region 1100 and region 1102 of FIG. 20. States A through C represent results obtained by Sobel filtering in region 1102 and states D and E results obtained by Sobel filtering in region 1100. State A is a neutral state with closed eyes, State B is a non-neutral state with the mouth opened in the longitudinal direction, and State C is a non-neutral state with the mouth open in the transverse direction. In addition, State D is a neutral state with open eyes, and State E is a non-neutral state with closed eyes.

First of all, comparison between State A, State B, and State C shows that in the neutral state with a closed mouth of State A the horizontal and vertical edge filter output values are generally low. By contrast, in the non-neutral states with an open mouth of State B or State C, the output values of the horizontal edge filter, in particular, are generally high. Moreover, comparing State D and State E of FIG. 21 in a similar manner, we can see that the neutral State D with open eyes has portions, in which the output values of the vertical edge filter are high, and in State E with closed eyes the output values of the vertical edge filter are generally low.

From the above results, it can be seen that the probability of a neutral state is high if the sum of the vertical edge filter output values obtained from region 1100 is not less than a prescribed value and the sum of the horizontal filter output values obtained from region 1102 is not higher than a prescribed value. In order to actually determine whether this is a neutral state, the following function is used to compute neutral state values.

$$\text{Degree of neutrality} = \sum_{i=1}^{N} f_i(\text{filter\_output})$$

Figure 22B:
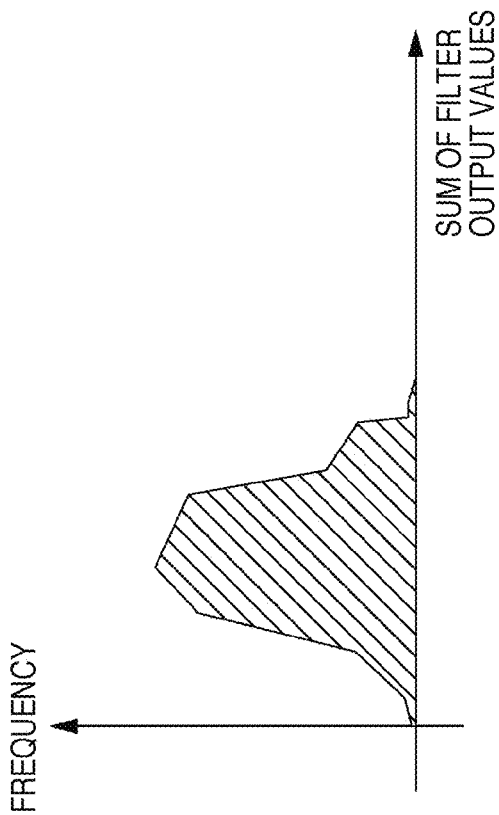
FIGS. 22A and 22B are diagrams illustrating vertical edge filter output sum histograms for State A and State E in FIG. 21.
Figure 22A:
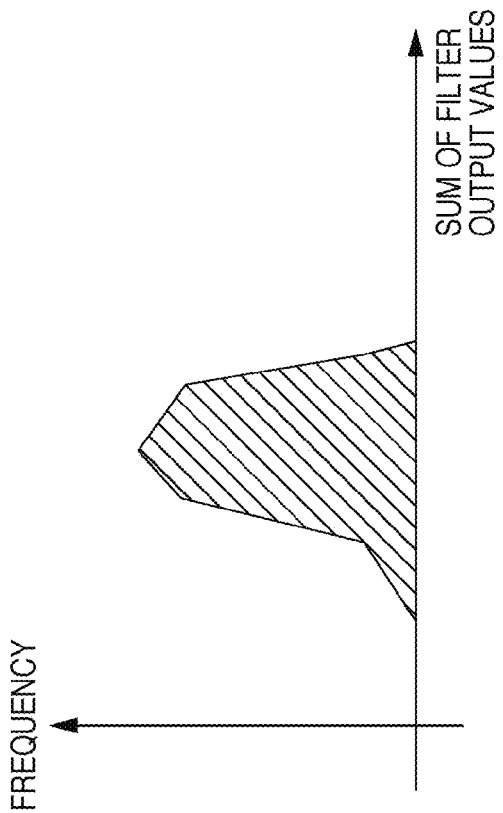

"N" is the number of features used for neutral state determination, "filter_output" is the sum of spatial filter output values, "$f_i$" is a function used to compute the degree of neutrality from the i-th feature. In the present embodiment, as mentioned above, N=2. It should be noted that each of the functions $f_i$ is weighted, such that, for instance, the sum of the horizontal filter output values obtained from region 1102 has a greater weight during neutral state determination than the sum of the vertical edge filter output values obtained from region 1100. More specifically, if the Max value of neutrality is 1, the Max value of neutrality obtained from the sum of the vertical edge filter output values obtained from region 1100 is set to 0.4 and the Max value of neutrality obtained from the sum of the horizontal filter output values obtained from region 1102 is set to 0.6. As for the function used to compute the degree of neutrality, a large quantity of neutral state images is subjected to horizontal and vertical edge detection and the degree is computed from statistical data concerning the sum of the respective filter output values. For instance, while the function used to compute the degree of neutrality is determined using histograms obtained from neutral state images, as shown in FIG. 22A and FIG. 22B, it is not limited to such methods. Moreover, the regions used to determine whether this is a neutral state are not limited to the mouth and eye regions only, and many other regions may be used as well.

Figure 20:
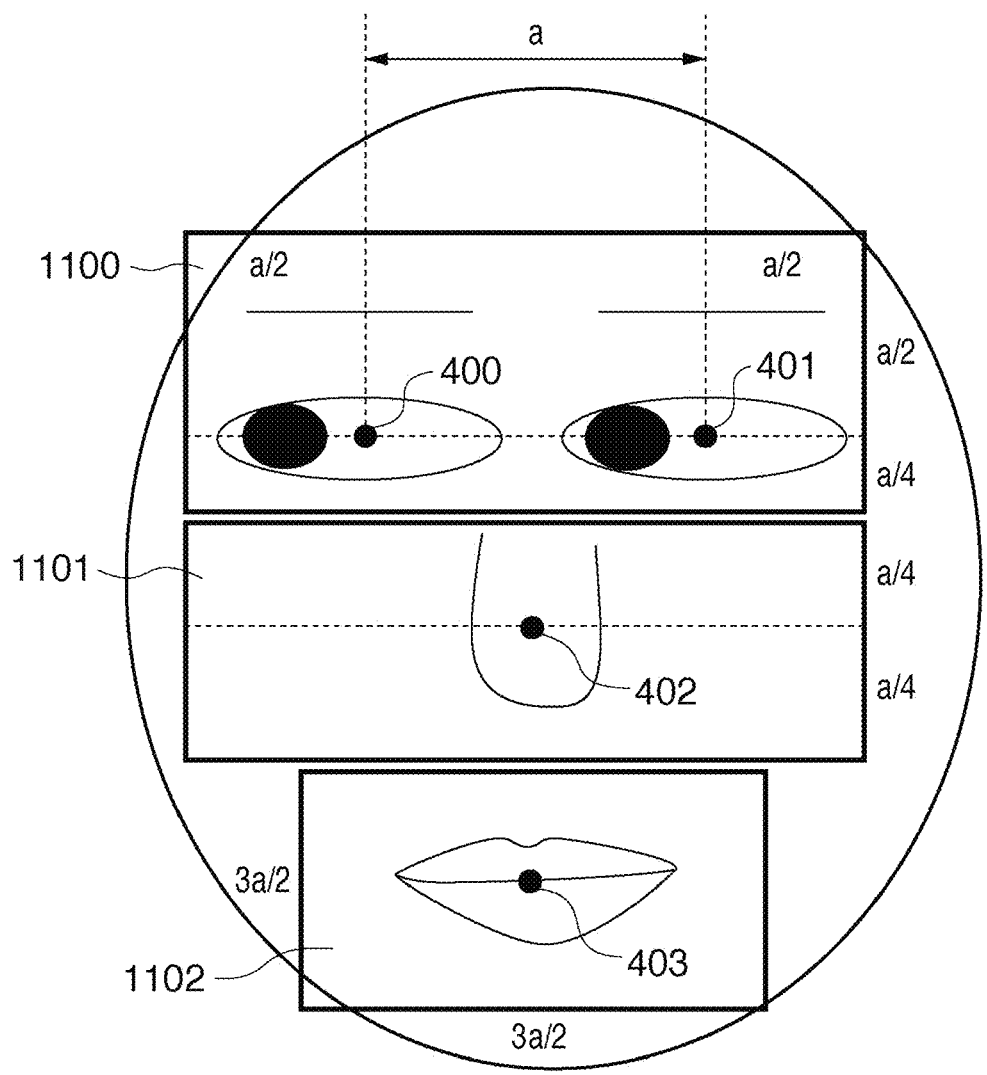
FIG. 20 is a diagram illustrating processing regions used for filtering according to the third embodiment.
Figure 21:
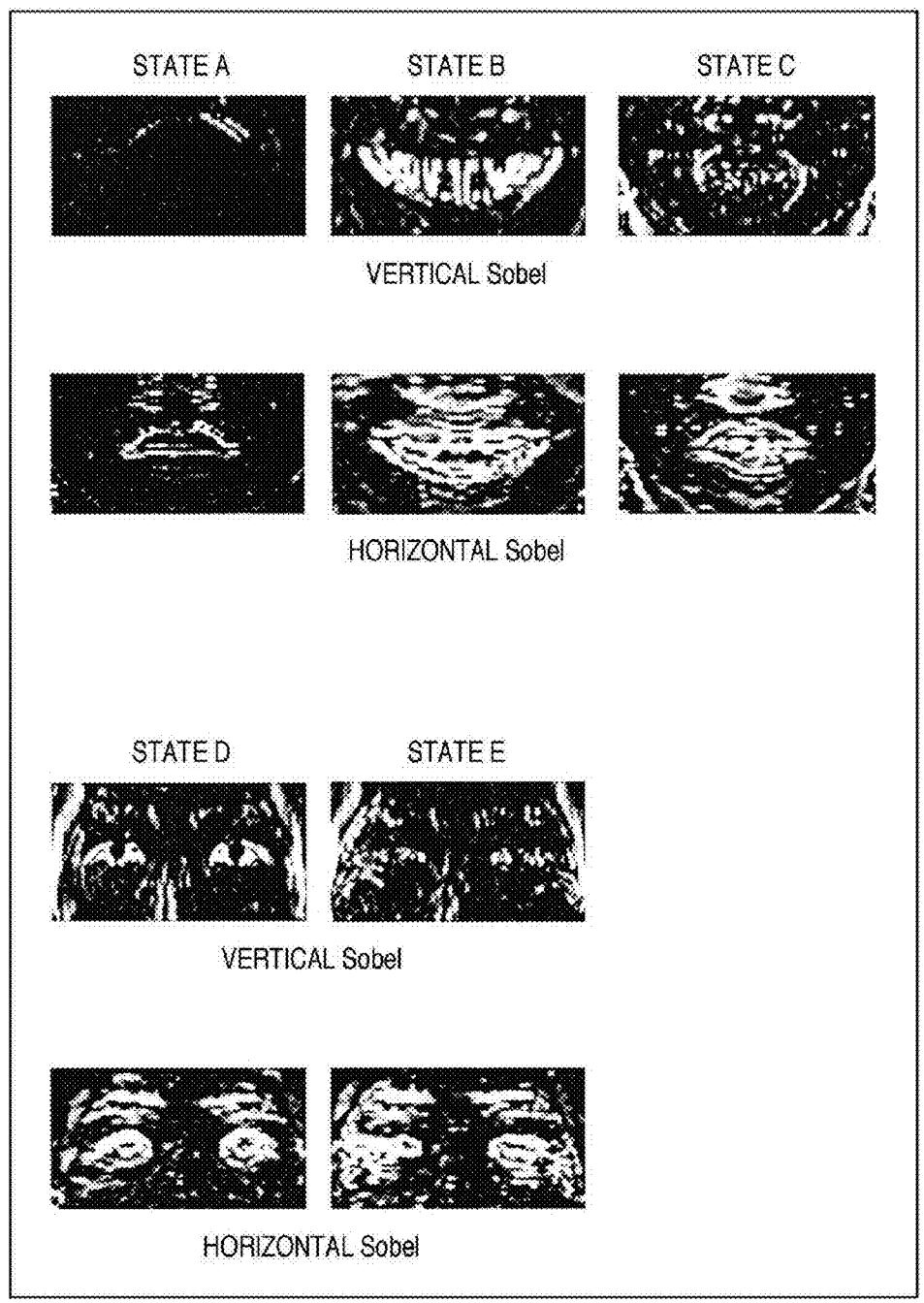
FIG. 21 is a diagram illustrating exemplary results obtained by filtering.

It should be noted that, as an alternative method of neutral state determination, in addition to the edge filter output values, one may extract the region of white color, which is the color of the teeth, in the region 1102 of FIG. 20 and determine whether this is a neutral state using the area (pixel count) of the white-color region.

Referring back to FIG. 19, in step S1006, the above-described method is used to determine whether this is a neutral state. Then, if it is determined that the state is neutral, the process advances to step S1007. If it is determined that it is not neutral, the process is terminated. In step S1007, reference features used for facial expression determination are extracted. As for the reference features used in the third embodiment, a total of six Sobel filter output value data items are used as the reference features for extraction because both horizontal and vertical edges are detected in regions 1100, 1101, and 1102 of FIG. 20.

Figure 23:
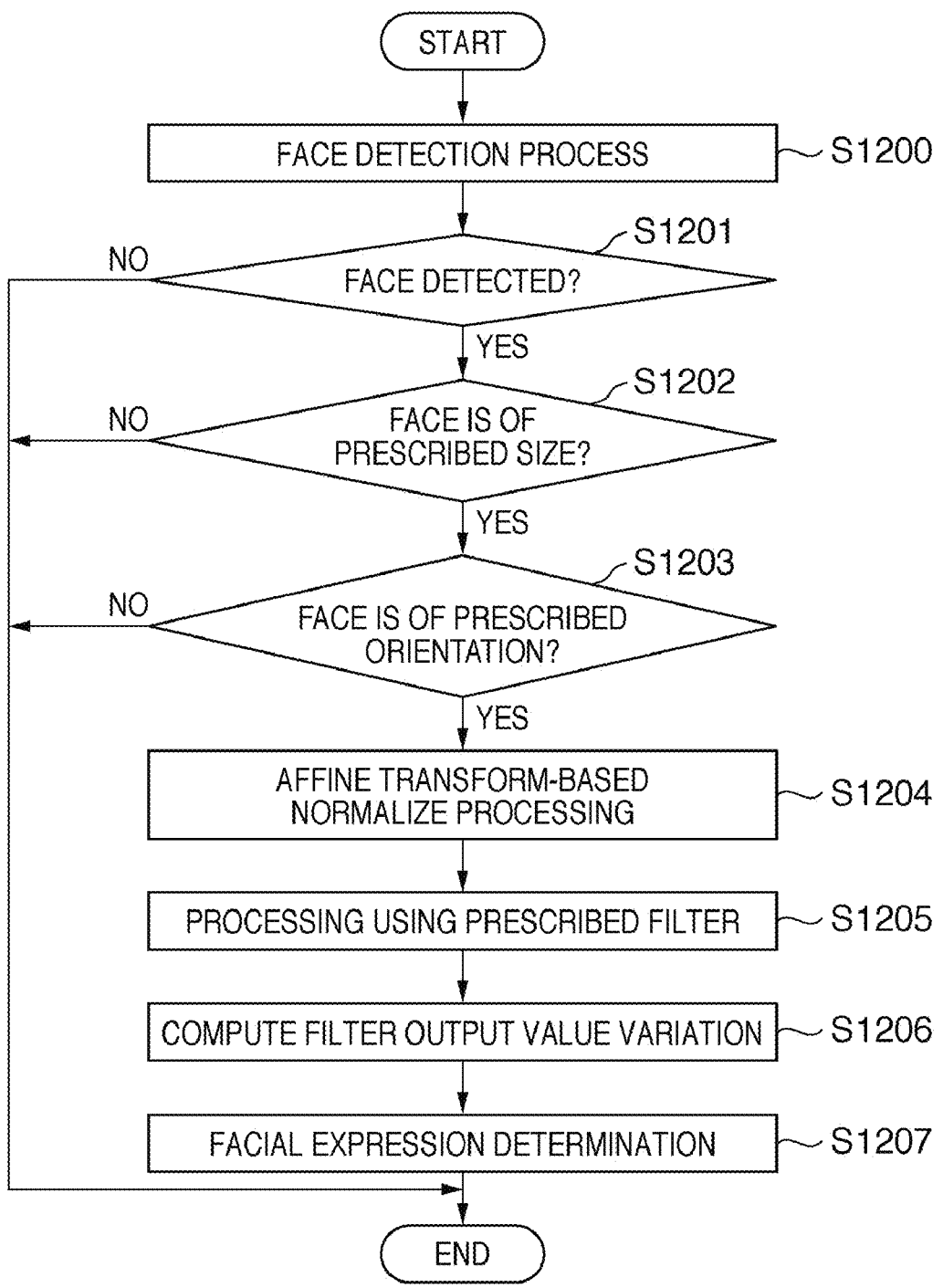
FIG. 23 is a flow chart illustrating the details of the facial expression determination process according to the third embodiment.

Next, explanations will be provided with regard to the process used in the third embodiment to determine the facial expression in step S916 of FIG. 16 using the above-mentioned reference features. FIG. 23 is a flow chart illustrating the facial expression determination process of the third embodiment in step S916. The processing performed up to steps S1200-S1204 is the same as in the first and second embodiments (S800-S804).

In step S1205, the system control circuit 112 performs the same processing as in step S1005 of FIG. 19 to obtain a total of six Sobel filter output values detecting the horizontal and vertical edges. In step S1206, the system control circuit 112 obtains respective filter differential output values based on the difference between the six Sobel filter output values extracted in step S1007 of FIG. 19 and the six Sobel filter output values detected in step S1205 of FIG. 23. In step S1207, the system control circuit 112 determines the facial expression using the six spatial filter differential output values obtained in step S1206.

Figure 24:
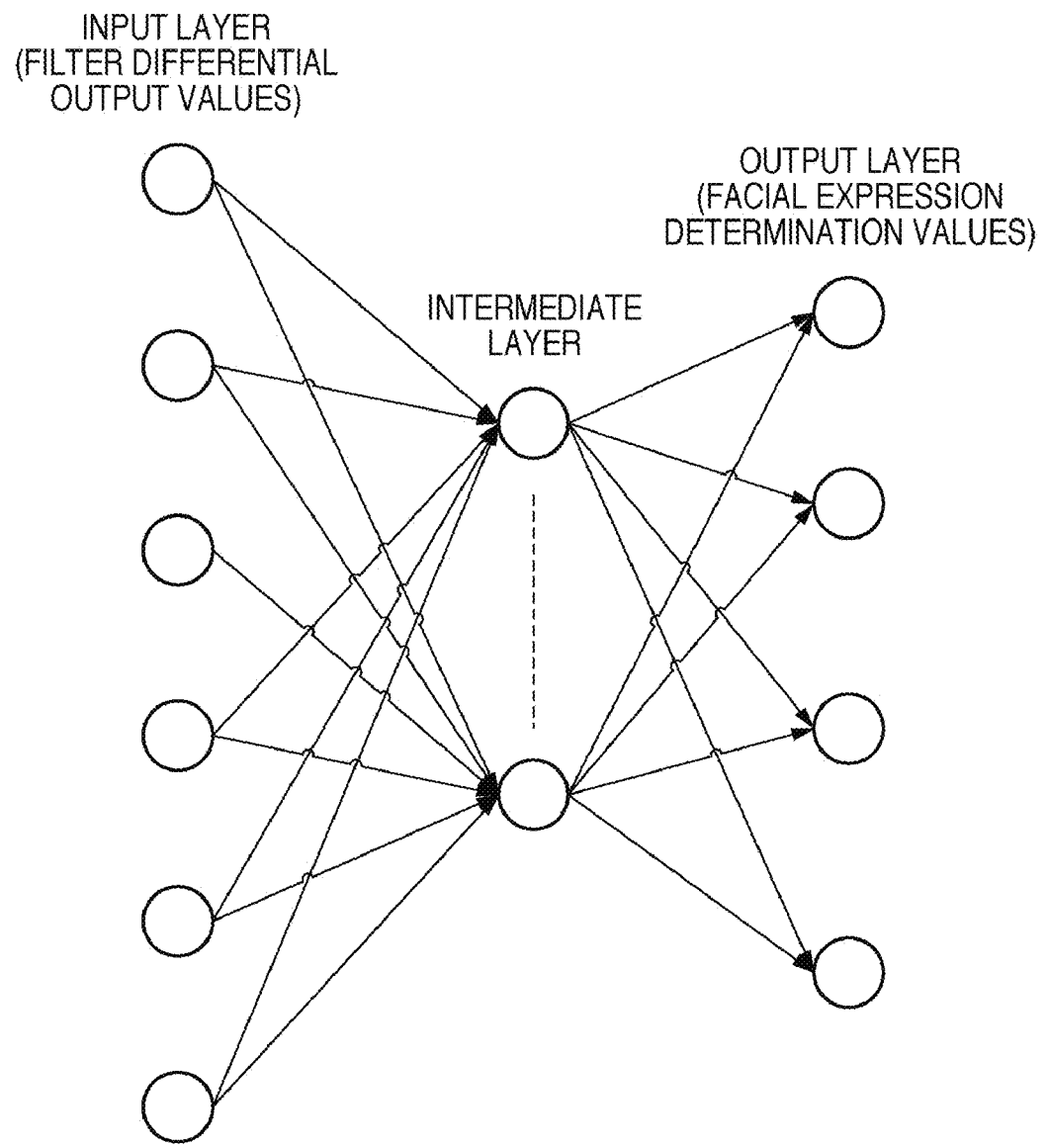
FIG. 24 is a diagram used to explain a neural network used to determine facial expressions.

In the present embodiment, the method used to determine the facial expression consists in using a neural network, in which, as shown in FIG. 24, neurons corresponding to six spatial filter differential output values respectively are used in the input layer and neurons corresponding to each facial expression to be determined are used in the output layer. The training method used for this neural network consists, for instance, in accumulating a large quantity of neutral state image data and image data for each facial expression to be determined and computing six filter differential output values based on these image data. There is a method, in which training is carried out such that, when these six filter differential output values for each facial expression are inputted to the input layer, the neuron output value corresponding to the facial expression in the output layer is 1 and the neuron output values corresponding to other facial expressions are 0. As a result of inputting the six filter differential output values obtained in step S1206 to the input layer of such a neural network, the neurons detecting the prescribed facial expression categories of the facial expression determination layer, that is, the output layer, fire most strongly. Accordingly, the facial expression can be determined by referring to the neuron values of the facial expression determination layer. It should be noted that the number of neurons in the output layer is determined in accordance with the number of face expressions to be determined for subsequent stage where imaging is controlled. For example, if imaging is executed upon smiling facial expression, two neurons corresponding to smiling facial expression and other facial expression respectively are provided. In the above case, a single neuron may be utilized, which outputs 1 or 0 based on whether smiling facial expression is detected. Furthermore, many neurons may be utilized for determining smiling facial expression, facial expression of closed eyes, crying facial expression and the like, and imaging is inhibited when facial expression of closed eyes, crying facial expression or the like is detected as well as execution of imaging when smiling facial expression is detected. Also, other classifiers may be used for facial expression determination instead of a neural network.

The explanations provided in the third embodiment above described a method, in which facial expressions are recognized after extracting reference features required during facial expression recognition based on spatial filter output values.

It should be noted that while the explanations provided in the third embodiment referred to a case, in which it was applied to an electronic still camera, it goes without saying that the embodiment is equally applicable to video cameras, etc. Moreover, instead of an image capturing apparatus, neutral state images of specific persons may be extracted from a database storing a large amount of images and images of specific persons with prescribed facial expressions may be extracted thereafter.

Embodiment 4

Figure 25:
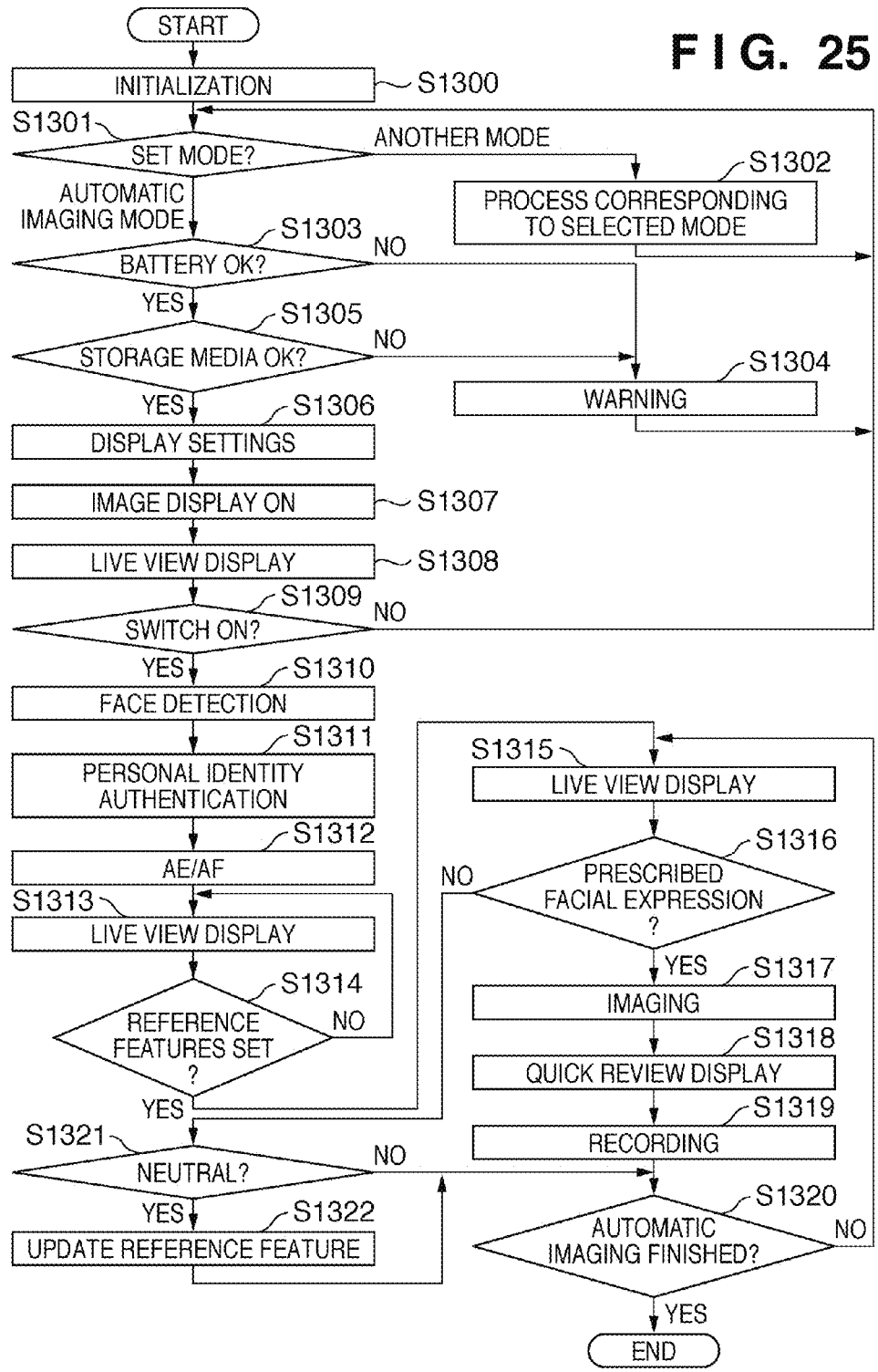
FIG. 25 is a flow chart illustrating the overall operation of the image capturing apparatus according to the fourth embodiment.

A fourth embodiment will be explained next. FIG. 25 is a flow chart illustrating the overall operation of the fourth embodiment. The processing performed up to steps S1300-S1320 is the same as in the second embodiment (steps S900-S920 of FIG. 16). If in step S1316 it is determined that this is not the prescribed facial expression, the process advances to step S1321. In step S1321, the system control circuit 112, in addition to neutral state determination, makes a determination as to updating reference features, as in step S1314. In other words, in the fourth embodiment, up to the moment when it is determined in step S1316 that the expression is the prescribed facial expression, if it is determined again that the state is a neutral state and that the reference features are to be updated as explained below, then the reference features are updated. Below, the process of step S1321 will be explained in detail.

Figure 26:
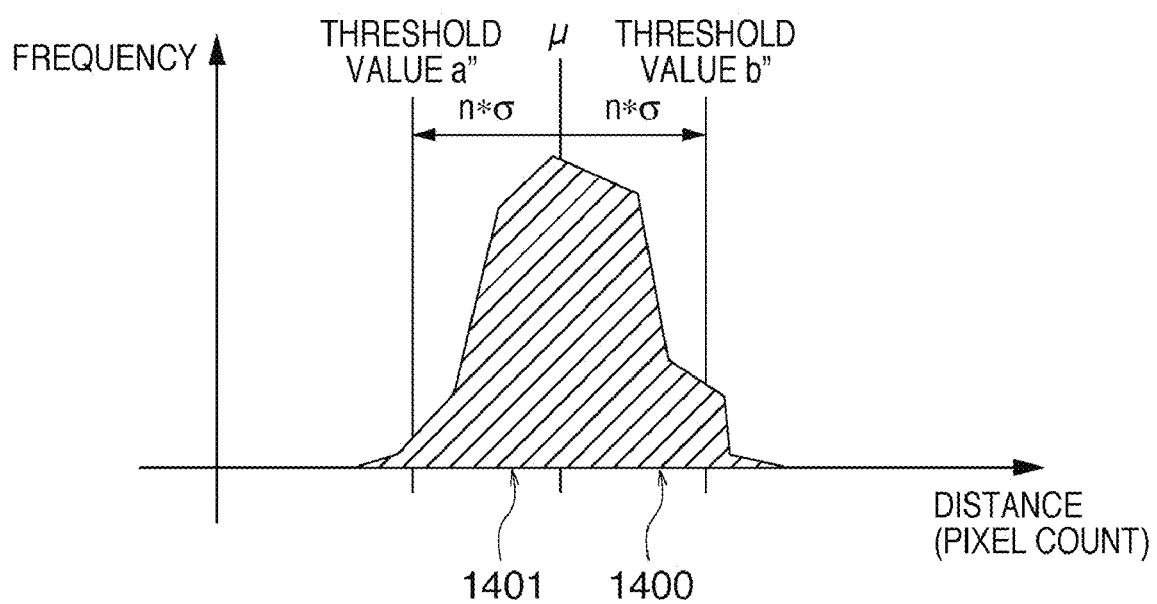
FIG. 26 is a diagram used to explain the determination processing method used to update the reference features.

In step S1321, as described above, a determination as to whether the state is a neutral state is first made by the method explained in the second embodiment. Next, a histogram of the feature 710 (or 711, 712) of FIG. 13 obtained from a large quantity of neutral images prepared in advance is represented as shown in FIG. 26. The feature 710 extracted in step S1314, that is, initially, is used as feature 1400 and the feature 710 extracted in step S1321 is used as feature 1401. In the fourth embodiment, if the features used for neutral state determination are closer to the average $\mu$ of the histogram prepared in advance, the reference features are updated. In case of FIG. 26, the feature 1401 extracted in step S1321 is located in a position that is closer to the average $\mu$ than the initially extracted feature 1400 (feature extracted in step S1314).

Accordingly, in step S1321 it is determined to update the reference features. If in step S1321 it is determined that the reference features should be updated, the process advances to step S1322. In step S1322, the system control circuit 112 updates the reference features. On the other hand, if in step S1321 it is determined that the reference features should not be updated, the process advances to step S1320, skipping step S1322. It should be noted that determination regarding the updating of the reference features is not limited to the above-described method, and the large quantities of neutral images prepared in advance may be limited to specific persons.

In this manner, the fourth embodiment makes it possible to improve the accuracy of facial expression recognition by updating the reference features in case of detection of neutral images more optimal for facial expression recognition.

Embodiment 5

Figure 27:
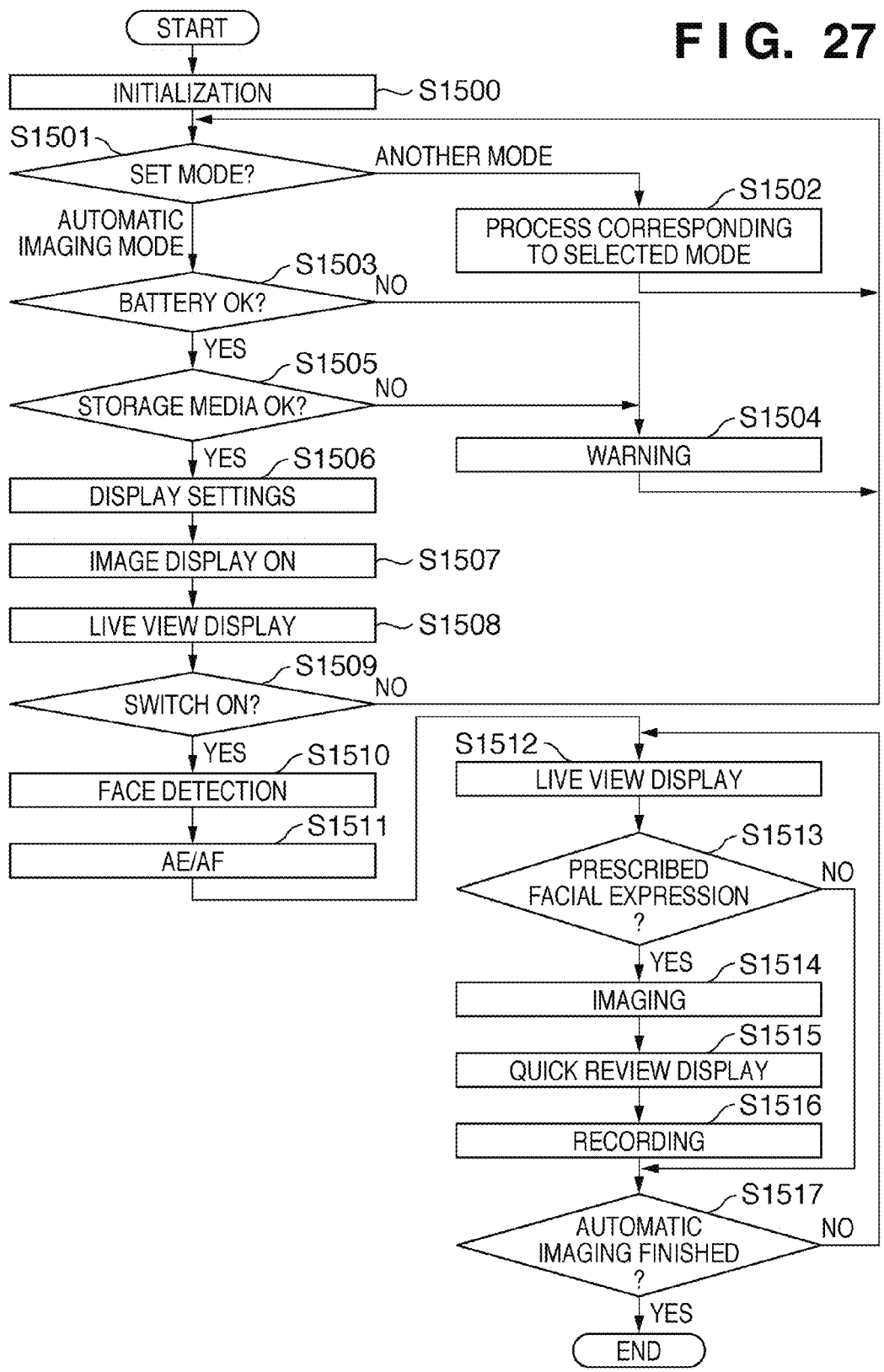
FIG. 27 is a flow chart illustrating the overall operation of the image capturing apparatus according to the fifth embodiment.
Figure 28:
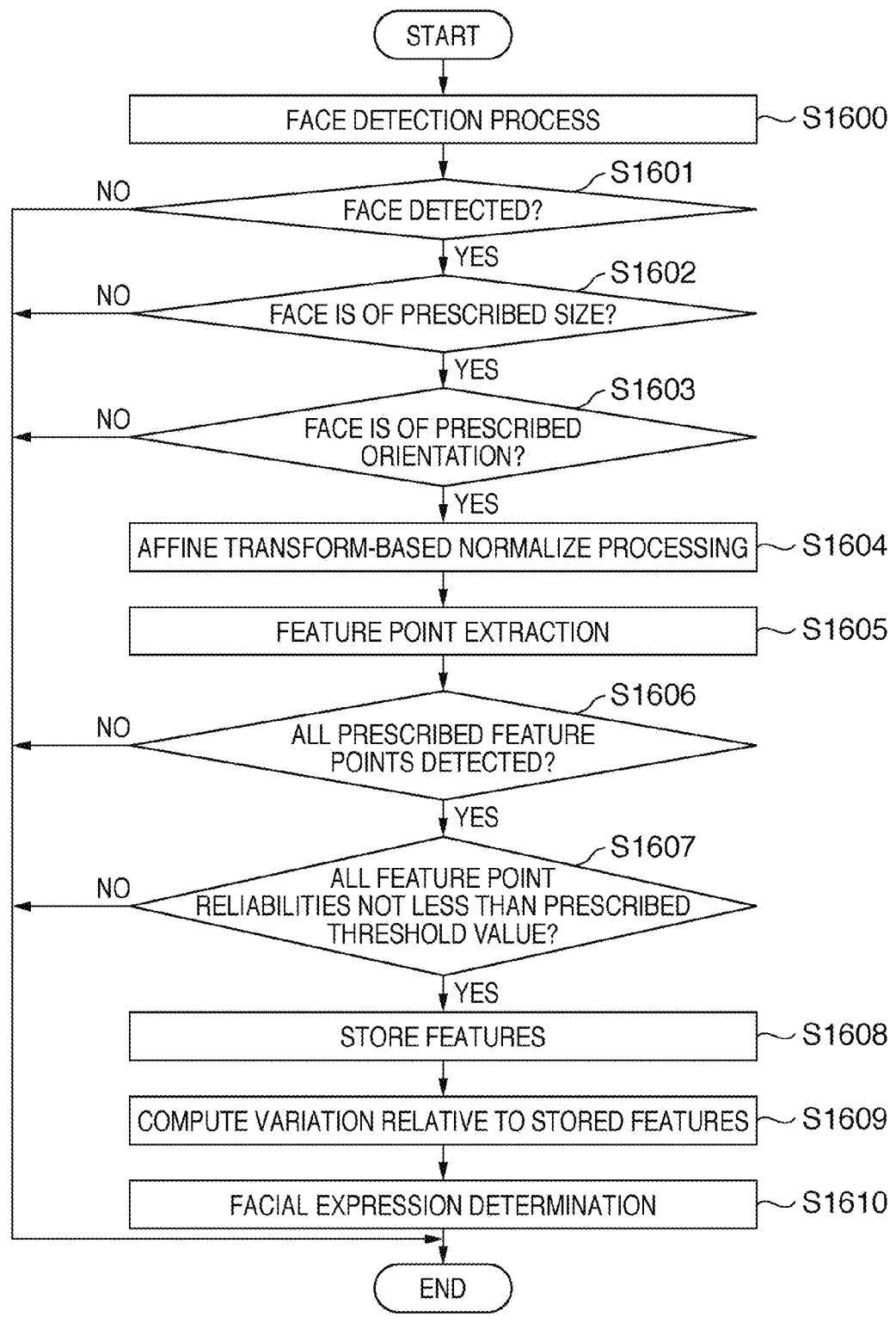
FIG. 28 is a flow chart illustrating the details of the facial expression determination process (step S1513) according to the fifth embodiment.

A fifth embodiment will be explained next. FIG. 27 is a flow chart illustrating the overall operation of the image capturing apparatus 100 according to the fifth embodiment. The processing performed up to steps S1500-S1512 is the same as in the first embodiment (steps S200-S212). A facial expression recognition is carried out in step S1513. Below, step S1513 will be explained in detail. FIG. 28 is a flow chart illustrating the process of step S1513 in detail.

The processing performed up to step S1600 to step S1606 is the same as in the facial expression determination of the first embodiment (steps S800-S806). In step S1607, the system control circuit 112 determines whether the reliability of all the prescribed feature points is not less than a prescribed threshold value. If the reliability of all the prescribed feature points is not less than the prescribed threshold value, the process advances to step S1608. On the other hand, if in step S1607 it is determined that the reliability of the prescribed feature points is not always equal or greater than the prescribed threshold value, the process is terminated.

Figure 29:
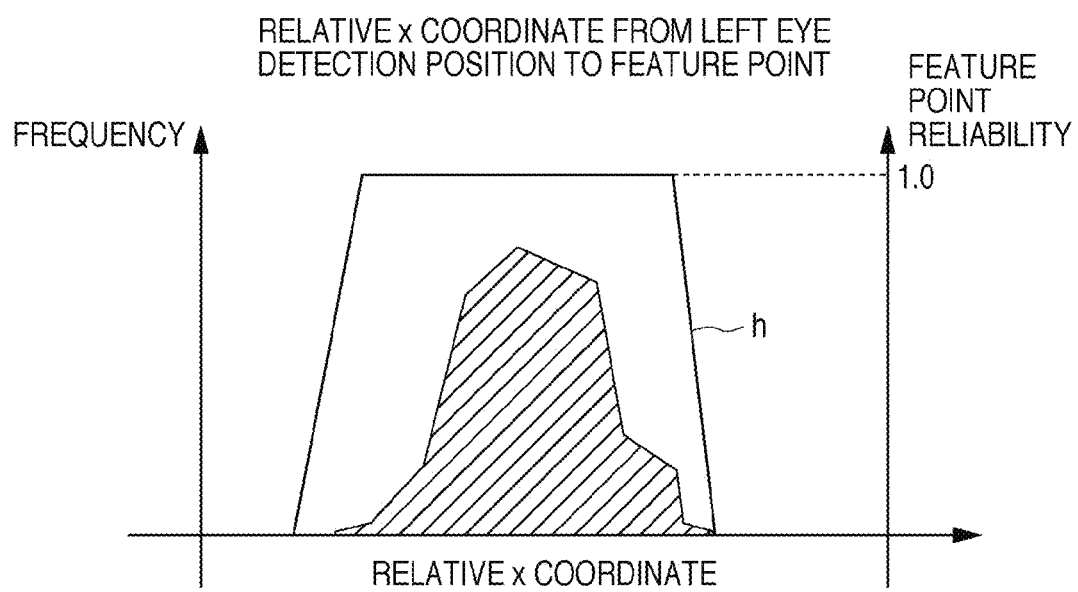
FIG. 29 is a diagram explaining the method of feature point reliability computation.

Below, explanations will be provided with respect to the reliability of the feature points. The reliability of the feature points is a value indicating the degree in which the detected feature points can be trusted as feature point detection results. The following is suggested as a feature point reliability computation method. For instance, in the present embodiment, the facial image is normalized using an affine transform. Accordingly, for instance, there is a method utilizing a spatial positional relationship between the eye detection positions and a feature point position, for example, the feature point 509 of FIG. 5 is located to the right of the left eye detection position 400 in FIG. 7. Moreover, as explained in the first embodiment, if a neural network is used for feature point detection, there are methods utilizing neuron output values. In the fifth embodiment, the spatial positional relationship of the above-mentioned feature points is used. For instance, relative coordinate values, or relative distances to feature points in relation to a prescribed position are statistically computed based on various facial expressions obtained from a massive database. For example, a relative x coordinate from the left eye detection position 400 in FIG. 6 to the feature point 509 in FIG. 5 is computed as shown in FIG. 29. A reliability computing function h is then established based on the computed statistical values as shown in FIG. 29, and reliability is computed using this reliability computing function h.

A reliability computing function is established in a similar manner for other feature points. It should be noted that the method of computing reliability is not limited to the method described in the present embodiment.

In step S1608, requisite features are extracted from feature points selected in accordance with the facial expressions subject to detection and the features are then stored. For instance, when recognizing a smiling facial expression, which is used here as an example of a facial expression, the features 712, 713, and 714 of FIG. 14 are extracted and stored in a memory. As a result of continued (repetition of S1512-S1516) automatic imaging due to step S1517, the memory contains current frames, with features 712, 713, and 714 captured previously with multiple frames interposed therebetween.

Figures 30A, 30B, 30C:
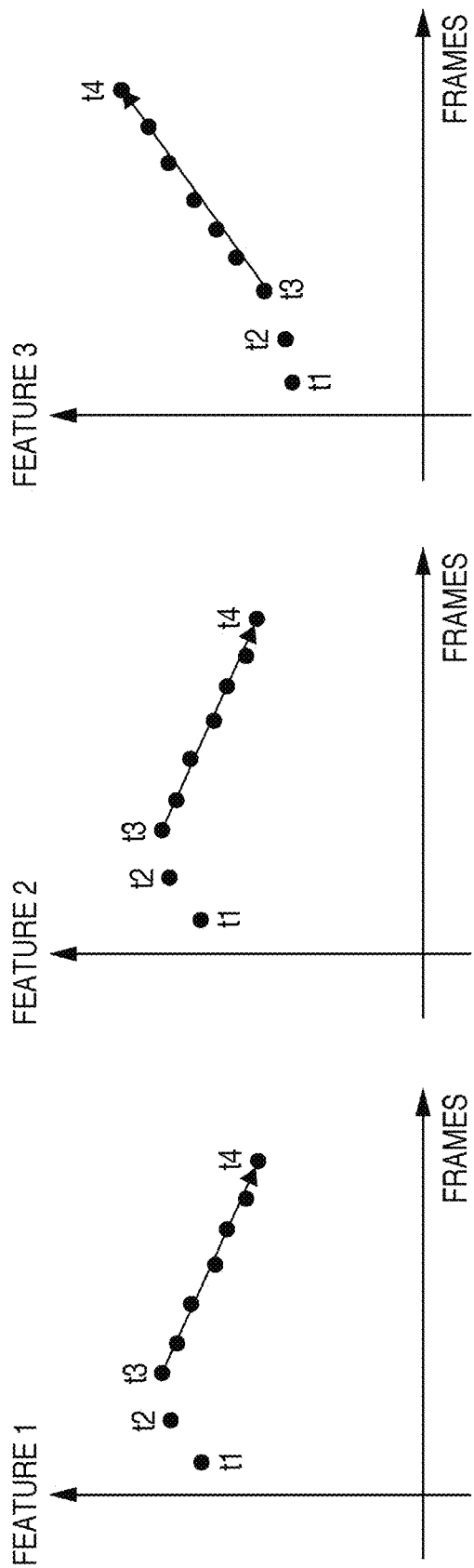
FIGS. 30A, 30B, and 30C are diagrams illustrating various feature variation patterns.

In step S1609, the system control circuit 112 computes feature variation from feature differences. Namely, differences are computed between the features 712, 713, and 714 extracted from frame t' and the features 712, 713, and 714 obtained from the image of a stored frame t. It should be noted that feature variation may be an average of multiple frames. As an example, FIG. 30A shows a variation pattern for the feature 713 of FIG. 14, FIG. 30B a variation pattern of the feature 714 of FIG. 14, and FIG. 30C a variation pattern for the feature 712 of FIG. 14. Moreover, frames t1 and t2 in FIGS. 30A to 30C represent the action of opening the mouth in the transverse direction, and frames t3 and t4 the action of smiling, during which the corners of the mouth are raised.

In step S1610, the facial expression is determined based on the variation of the features of frame t' in relation to the features of frame t obtained in step S1609, for example, based on the variation of the feature 1, feature 2, and feature 3 of the frames t3 and t4 of FIGS. 30A to 30C. For instance, the facial expression is determined based on the above-described variation using hidden Markov models, such as the ones described in the Specifications of Japanese Patent Nos. 02962549 and 02840816. As a result, the facial expression is determined based on the variation patterns of the features. It should be noted that methods other than hidden Markov models may be used as well.

Referring back to FIG. 27, if the prescribed facial expression is recognized in step S1513, the process advances to step S1514. On the other hand, if the prescribed facial expression is not recognized, the process advances from step S1513 to step S1517. The processing performed in steps S1514-S1517 is the same as in the first embodiment (steps S216-S219).

As described above, feature information satisfying prescribed conditions is extracted and facial expression is determined based on the variation pattern of the feature information, which makes it possible to carry out the facial expression recognition with higher accuracy.

As described above, in the above-described embodiments, instead of extracting reference features in advance, (1) reference features are extracted automatically in accordance with a prescribed timing based on prescribed information during facial expression determination; (2) facial expressions are determined based on extracted reference features and on the variation patterns of the features.

For this reason, the above-described embodiments make it possible to perform facial expression recognition in which the following problems
are eliminated: (1) that neutral images must be registered in advance; (2) facial expressions can be recognized only for registered persons; (3) more memory areas are required because the number of images, etc. that have to be registered depends on the number of persons subject to the facial expression recognition; (4) when the imaging environment during registration and imaging environment during facial expression recognition are different, facial expressions are sometimes impossible to recognize with accuracy due to the difference between the imaging environments.

Although some embodiments have been described in detail above, the present invention can contemplate embodiments such as, for instance, systems, devices, methods, programs, or storage media, etc. Specifically, it may be applied to a system composed of a plurality of devices, as well as applied to an apparatus constituted by a single device. In other words, while the above-described embodiments were adapted for implementation of facial expression determination using an image capturing apparatus, the above-described facial expression determination process may be carried out by an information processing device.

Accordingly, the present invention includes cases, wherein the functionality of the above-described embodiments is realized by supplying a software program to the system or apparatus directly or remotely and directing the computer of the system or apparatus to read and execute the supplied program code. In such a case, the supplied programs are computer programs corresponding to the flow charts depicted in the drawings in the embodiments.

Therefore, the program code installed on a computer in order to implement the functional processing of the present invention on the computer is itself an implementation of the present invention. In other words, the present invention comprises computer programs used to implement the functional processing of the present invention.

In such a case, as long as they possess the requisite program functionality, they may take various forms, such as object code, interpreter-executed programs, script data supplied to the OS, etc.

The following media are suggested as computer-readable storage media used for supplying the computer programs. For example, it may be a Floppy™ disk, a hard disk, an optical disk, a magneto-optical disk, an MO, a CD-ROM, a CD-R, a CD-RW, a magnetic tape, a non-volatile memory card, a ROM, or a DVD (DVD-ROM, DVD-R), etc.

In addition, connecting to an Internet homepage using a browser on a client computer and downloading the computer program of the present invention from the homepage onto a hard disk or another storage medium is suggested as a method of supplying the program. In such a case, the downloaded program may be a compressed file with self-installation functionality. Moreover, it can also be implemented by dividing the program code constituting the program of the present invention into a plurality of files and downloading the respective files from different homepages. In other words, WWW servers that allow a plurality of users to download program files used to implement the functional processing of the present invention on the computer are also included in the present invention.

Moreover, it may take the form of encrypting the program of the present invention, storing it on CD-ROMs or other storage media, and disseminating it among users. In such a case, users who meet certain criteria may be allowed to download key information used to decrypt the encryption from a homepage through the Internet and use the key information to execute the encrypted program and install the program on a computer.

Moreover, in addition to implementing the above-described functionality of the embodiments based on the execution of read-out program by the computer, the functionality of the embodiments may be implemented based on the instructions of the program in cooperation with an OS etc. running on the computer. In such a case, the OS etc. carries out either part or all of the actual processing and the above-described functionality of the embodiments is implemented based on such processing.

Furthermore, either part or all of the above-described functionality of the embodiments may be implemented by writing the program read from the storage media to a memory provided in an expansion unit connected to the computer or an expansion board inserted into the computer. In such a case, after the program has been written to the expansion board or expansion unit, the CPU etc. provided in the expansion board or expansion unit carries out either part or all of the actual processing based on the instructions of the program.

The present invention makes it possible to determine facial expressions with accuracy based on individual facial features while making it unnecessary to register images of specific facial expressions in advance.

While the present invention has been described with reference to exemplary embodiments, it is to be understood that the invention is not limited to the disclosed exemplary embodiments The scope of the following claims is to be accorded the broadest interpretation so as to encompass all such modifications and equivalent structures and functions.

This application claims the benefit of Japanese Patent Application No 2007-160680, filed Jun. 18, 2007, which is hereby incorporated by reference herein in its entirety.

The invention claimed is:

1. A facial expression recognition apparatus, comprising:
an image input unit configured to sequentially input images;
a face detection unit configured to detect faces in images obtained by the image input unit;
a start determination unit configured to determine whether to start facial expression determination based on facial image information of each of the faces detected by the face detection unit;
a first extraction unit configured to extract first feature information from the facial image information when the start determination unit determines that facial expression determination should be started based on the facial image information;
a second extraction unit configured to extract second feature information from facial image information of a face detected by the face detection unit after the start determination unit determines that the facial expression determination should be started; and
a facial expression determination unit configured to determine a facial expression of the detected face corresponding to the second feature information based on the first and second feature information,
wherein at least the facial expression determination unit is implemented by a processor, and
wherein the start determination unit determines that facial expression determination should be started when the variation of the features obtained from the facial image information detected in a series of images over a predetermined number of frames or a predetermined time stays within a prescribed range.

2. The apparatus according to claim 1, wherein the facial expression determination unit determines facial expressions based on a difference or ratio between the second feature information and the first feature information.

3. The apparatus according to claim 1, further comprising a validity determination unit configured to detect at least one of the face size, face orientation and detection reliability for the faces detected by the face detection unit and to determine the validity of the detected faces based on the detection results,
wherein the start determination unit and the facial expression determination unit carry out determination with respect to image information of faces that have been determined to be valid by the validity determination unit.

4. The apparatus according to claim 1, wherein the start determination unit determines whether to start facial expression determination based on the coordinate values of the feature points constituting facial organs in relation to a specific position on the faces.

5. The apparatus according to claim 1, wherein the start determination unit determines whether to start facial expression determination based on the distance between a specific position on the detected faces and feature points constituting facial organs.

6. The apparatus according to claim 1, further comprising a spatial filtering unit, which carries out spatial filtering on the detected faces, and wherein the start determination unit determines whether to start facial expression determination based on output values obtained by carrying out the spatial filtering on the detected faces.

7. The apparatus according to claim 1, wherein the start determination unit holds criteria set by statistically pre-processing features obtained from a plurality of facial images and determines that facial expression determination should be started when the features obtained from the detected facial image information are within a prescribed range from the criteria.

8. The apparatus according to claim 1, wherein the start determination unit determines that facial expression determination should be started when the pixel count of a specific region in the detected facial images satisfies a prescribed condition.

9. The apparatus according to claim 8, wherein the prescribed condition is satisfied by the pixel count of the specific region when the pixel count of the pupillary region is not less than a prescribed value.

10. The apparatus according to claim 8, wherein the prescribed condition is satisfied by the pixel count of the specific region when the pixel count of the tooth-colored region does not exceed a prescribed value.

11. The apparatus according to claim 1, wherein the first feature information is updated using feature information acquired by the first extraction unit after a start determination is made again when the start determination unit determines again that facial expression determination should be started, until the facial expression determination unit determines the facial expression on the face.

12. The apparatus according to claim 1, wherein the facial expression determination unit weights the variation of the features contained in the first feature information and the features contained in the second feature information in order to determine the facial expressions of the detected faces based on the weighted variations.

13. The apparatus according to claim 1, further comprising a personal identity authentication unit configured to carry out personal identity authentication based on the facial images detected by the face detection unit.

14. An image capturing apparatus comprising:
the facial expression recognition apparatus according to claim 1;
a supplying unit configured to acquire images in chronological order using an image capturing unit and to supply the acquired images to the image input unit; and
a recording unit configured to record the images as captured images when the facial expression determination unit determines that the facial expression is a prescribed facial expression.

15. A facial expression recognition method, comprising the steps of:
image input, which involves sequentially inputting images;
face detection, which involves detecting faces in images obtained in the image input step;
start determination, which involves determining whether to start facial expression determination based on facial image information of each of the faces detected in the face detection step;
a first extraction, which involves extracting first feature information from the facial image information when the start determination step determines that facial expression determination should be started based on the facial image information;
a second extraction, which involves extracting second feature information from facial image information of a face detected in the face detection step after the start determination step determines that the facial expression determination should be started; and
facial expression determination, which involves determining facial expression of the detected face corresponding to the second feature information based on the first and second feature information,
wherein the start determination step determines that facial expression determination should be started when the variation of the features obtained from the facial image information detected in a series of images over a predetermined number of frames or a predetermined time stays within a prescribed range.

16. A non-transitory computer-readable storage medium storing a computer program for causing a computer to execute the facial expression recognition method according to claim 15.

* * * * *